US012033794B2

(12) United States Patent
Green

(10) Patent No.: US 12,033,794 B2
(45) Date of Patent: Jul. 9, 2024

(54) METHODS AND SYSTEMS FOR PRODUCING MAGNETIC MATERIAL

(71) Applicant: NEO PERFORMANCE MATERIALS (SINGAPORE) PTE LTD, Singapore (SG)

(72) Inventor: William Ray Green, Singapore (SG)

(73) Assignee: NEO PERFORMANCE MATERIALS (SINGAPORE) PTE LTD, Singapore (SG)

( * ) Notice: Subject to any disclaimer, the term of this patent is extended or adjusted under 35 U.S.C. 154(b) by 144 days.

(21) Appl. No.: 17/508,730

(22) Filed: Oct. 22, 2021

(65) Prior Publication Data

US 2022/0351900 A1 Nov. 3, 2022

Related U.S. Application Data

(63) Continuation of application No. PCT/SG2021/050233, filed on Apr. 28, 2021.

(51) Int. Cl.
*H01F 41/02* (2006.01)
*B22D 11/06* (2006.01)
*B22D 11/16* (2006.01)
*B22F 9/06* (2006.01)
*H01F 1/053* (2006.01)
(Continued)

(52) U.S. Cl.
CPC ......... *H01F 41/0253* (2013.01); *B22D 11/16* (2013.01); *B22F 9/06* (2013.01);
(Continued)

(58) Field of Classification Search
CPC .... H01F 41/0253; H01F 1/0571; H01F 41/02; H01F 1/053; H01F 1/147; H01F 1/20;
(Continued)

(56) References Cited

U.S. PATENT DOCUMENTS 2,289,774 A 7/1942 Graves
2021/0062310 A1* 3/2021 Chen ....................... C22C 38/12

FOREIGN PATENT DOCUMENTS

JP S-63100930 A * 5/1988 ............. B01J 19/28
JP S63100930 A 5/1988
(Continued)

OTHER PUBLICATIONS

JPS-63100930-A: Espacenet English machine translation (Year: 1988).*

(Continued)

*Primary Examiner* — Adil A. Siddiqui
(74) *Attorney, Agent, or Firm* — Baker & McKenzie LLP

(57) ABSTRACT

Embodiments relate to systems and methods for producing magnetic material. The method includes providing a mixture of alloys. The composition of alloy are not particularly limited. The method includes melting the mixture of alloys to arrive at a molten mixture of alloys. The method includes performing a melt-spinning process to rapidly solidify the molten mixture of alloys via a rotatable wheel to arrive at a preliminary metallic ribbon. The preliminary metallic ribbon having an elongated flat body with a bottom side and a top side, the top side opposite to the bottom side. The method includes performing a grain size refinement and uniformity process, the grain size refinement and uniformity process including delivering a first coolant directly to at least a central region of the top side and/or bottom side of the preliminary metallic ribbon to arrive at a final metallic ribbon.

19 Claims, 6 Drawing Sheets

(51) Int. Cl.
*H01F 1/057* (2006.01)
*H01F 1/147* (2006.01)
*H01F 1/20* (2006.01)

(52) U.S. Cl.
CPC ........... *H01F 1/053* (2013.01); *H01F 1/0571* (2013.01); *H01F 1/147* (2013.01); *H01F 1/20* (2013.01); *H01F 41/02* (2013.01); *B22D 11/0611* (2013.01); *C22C 2202/02* (2013.01)

(58) Field of Classification Search
CPC ....... B22D 11/0611; B22D 11/16; B22F 9/06; C22C 2202/02
See application file for complete search history.

(56) References Cited

FOREIGN PATENT DOCUMENTS

| | | | | |
|---|---|---|---|---|
| WO | 2020022955 A1 | | 1/2020 | |
| WO | WO-2020022955 A1 | * | 1/2020 | C22C 1/02 |

OTHER PUBLICATIONS

Fourth Office Action issued in German Patent Application No. 10 2021 125 771.9, Oct. 26, 2022.

First Office Action issued in German Patent Application 10 2021 125 771.9, Apr. 6, 2022.

Second Office Action issued in German Patent Application 10 2021 125 771.9, Aug. 12, 2022.

Ketov, S. V. et al.,Rejuvenation of metallic glasses by non-affine thermal strain. In: Nature, vol. 524, 2015, No. 7564, ISSN 0028-0836. DOI : 10.1038/nature 14674, 17 pages.

Third Office Action issued in German Patent Application 10 2021 125 771.9, Sep. 22, 2022.

First Office Action dated Jul. 19, 2023 in connection with Japanese Application No. 2021-568137, 6 pages.

First Office Action dated Aug. 11, 2023 in connection with Korean Patent Application No. 10-2021-7033986, 7 pages.

* cited by examiner

| | Average Grain ze ( ) | | |
|---|---|---|---|
| | Left | Center | Right |
| Co parat ve Example | 43.5 | 46.9 | 39.1 |
| Example E bodiment 1 | 38.1 | 39. | 37.7 |

| | Average Grain ze ( ) | | |
|---|---|---|---|
| | Left | Center | Right |
| Top s de | 44.7 | 49.2 | 41.7 |
| Bottom s de | 42.2 | 44.7 | 36.4 |

| | Average Grain Size ( m) | | |
|---|---|---|---|
| | Left | Center | Right |
| Top s de | 39.3 | 40.1 | 38.7 |
| Bottom side | 36.8 | 38.1 | 36.6 |

METHODS AND SYSTEMS FOR PRODUCING MAGNETIC MATERIAL

CROSS-REFERENCE TO RELATED APPLICATIONS

This application is a continuation application of International Application No. PCT/SG2021/050233 filed Apr. 28, 2021, the contents of which is hereby expressly incorporated by reference in its entirety, including the contents and teachings of any references contained therein.

TECHNICAL FIELD

The present disclosure relates generally to systems and methods for producing magnetic material, and more specifically, to improved melt-spinning systems and methods for producing magnetic material.

BACKGROUND

Melt-spinning is a process used in the manufacture of magnetic materials. A typical melt-spinning process involves providing molten material onto a rotating wheel, or the like. The molten material rapidly solidifies (or rapidly quenches) upon contact with a chilled or cooled surface of the rotating wheel, resulting in a thin metallic ribbon. Generally, a flow rate of the molten material applied to the rotating wheel is selected based on, among other things, a rotational speed of the rotating wheel. The flow rate and rotational speed of the rotating wheel used in the melt-spinning process in turn affects the thickness of the metallic ribbon produced, throughput (amount produced), grain sizes, rotating wheel run time, and magnetic properties of magnets formed from such metallic ribbons.

BRIEF SUMMARY

When producing magnetic materials using conventional melt-spinning processes and systems, a metallic ribbon is formed by rapidly solidifying (or rapidly quenching) a molten mixture of alloys. Such metallic ribbons have very fine, nano-scaled grain sizes. A fine and uniform grain size throughout the metallic ribbon is critical to the magnetic properties (e.g., remanence and coercivity) of the final magnet, regardless of the process used to form the magnet from the metallic ribbon.

Conventional melt-spinning processes and systems generally suffer from non-uniformity of grain sizes for the metallic ribbon, especially across a width of the metallic ribbon. More specifically, average grain sizes in the center areas of metallic ribbons formed using conventional melt-spinning processes are larger than average grain sizes in the sides (and/or edges) of the metallic ribbon, thereby resulting in non-uniform grain sizes. It is recognized in the present disclosure that such variations in average grain sizes are a direct result of the center areas receiving less cooling than the sides (and/or edges) during the rapid solidification process.

The present disclosure relates generally to systems, subsystems, methods, and processes for addressing conventional problems, including those described above and in the present disclosure, and more specifically, example embodiments relate to systems, subsystems, methods, and processes for producing magnetic materials.

In an exemplary embodiment, a method of producing magnetic material is described. The method includes providing a mixture of alloys. The compositions of alloy are not particularly limited. The method includes melting the mixture of alloys to arrive at a molten mixture of alloys. The method includes performing a melt-spinning process to rapidly solidify the molten mixture of alloys via a rotatable wheel to arrive at a preliminary metallic ribbon. The preliminary metallic ribbon having an elongated flat body with a bottom side and a top side, the top side opposite to the bottom side. The method includes performing a grain size refinement and uniformity process, the grain size refinement and uniformity process including delivering a first coolant directly to at least a central region of the top side and/or bottom side of the preliminary metallic ribbon to arrive at a final metallic ribbon.

The first coolant delivered to at least the central region of the top side and/or bottom side of the preliminary metallic ribbon may include a stream of liquid argon, liquid helium, and/or one or more other noble gas in liquid state. The grain size refinement and uniformity process may include directly delivering the first coolant to at least the central region of the top side and/or bottom side of the preliminary metallic ribbon. The grain size refinement and uniformity process may include directly delivering the first coolant to the top side and the bottom side of the preliminary metallic ribbon. An average grain size of a central portion of the final metallic ribbon may be at least 5% less than a conventional average grain size of a central portion of a conventional metallic ribbon produced using a conventional method; and the conventional method may include performing the melt-spinning process to the rapidly solidify the molten mixture of alloys using the rotatable wheel and not performing the grain size refinement and uniformity process. The average grain size of the central portion of the final metallic ribbon may be at least 10% less than the conventional average grain size of the central portion of the conventional metallic ribbon produced using the conventional method. A flow rate of the molten mixture of alloys provided to the rotatable wheel may be at least 10% greater than a conventional flow rate; the rapid solidifying may include rotating the rotatable wheel at a first wheel speed; an average grain size of a central portion of the final metallic ribbon may be at least 5% less than a conventional average grain size of a central portion of a conventional metallic ribbon produced using a conventional method; the conventional flow rate is a maximum flow rate used in the conventional method for producing the conventional metallic ribbon; and the conventional method may include providing the molten mixture of alloys to the rotatable wheel rotating at the first wheel speed and not performing the grain size refinement and uniformity process. The flow rate of the molten mixture of alloys provided to the rotatable wheel may be at least 30% greater than the conventional flow rate; and the average grain size of the central portion of the final metallic ribbon may be at least 10% less than the conventional average grain size of the central portion of the conventional metallic ribbon produced using the conventional method. A difference between an average grain size of a central portion of the final metallic ribbon and an average grain size of an edge portion of the final metallic ribbon may be less than 10%. A difference between an average grain size of a central portion of the final metallic ribbon and an average grain size of both edge portions of the final metallic ribbon may be less than 10%. A difference between an average grain size of a central portion of the final metallic ribbon and an average grain size of an edge portion of the final metallic ribbon may be less than 5 nm. A difference between an average grain size of a central portion of the final metallic ribbon and an average grain size of both edge portions of the final metallic ribbon may be less than 5 nm. An average grain size of a central portion and both edge portions of the final metallic ribbon may be less than 50 nm. An average grain size of a central portion of the final metallic ribbon may be less than 50 nm. A difference between an average grain size of a central portion of the final metallic ribbon and an average grain size of an edge portion of the final metallic ribbon may be less than 5%. A difference between an average grain size of a central portion of the final metallic ribbon and an average grain size of both edge portions of the final metallic ribbon may be less than 5%. A difference between an average grain size of a central portion of the final metallic ribbon and an average grain size of an edge portion of the final metallic ribbon may be less than 2 nm. A difference between an average grain size of a central portion of the final metallic ribbon and an average grain size of both edge portions of the final metallic ribbon may be less than 2 nm. An average grain size of a central portion and both edge portions of the final metallic ribbon may be less than 40 nm. An average grain size of a central portion of the final metallic ribbon may be less than 40 nm. The mixture of alloys may include RE-Fe—Co-M-B, where RE is one or more rare earth elements, and wherein M is one or more elements selected from the elements Ga, Cu, Al, Nb, Zr, W, Ti, Si, C, and Mo.

In another exemplary embodiment, a method of producing magnetic material is described. The method includes providing a mixture of alloys; and melting the mixture of alloys to arrive at a molten mixture of alloys; and performing a melt-spinning process to rapidly solidify the molten mixture of alloys via a rotatable wheel to arrive at a preliminary metallic ribbon. The preliminary metallic ribbon having an elongated flat body with a bottom side and a top side, the top side opposite to the bottom side. The method includes performing a grain size refinement and uniformity process, the grain size refinement and uniformity process including delivering a first coolant directly to at least a central region of the top side and/or bottom side of the preliminary metallic ribbon to arrive at a final metallic ribbon.

A difference between an average grain size of the central region of the bottom side of the final metallic ribbon and an average grain size of an edge portion of the bottom side of the final metallic ribbon may be less than 10%, or preferably less than 5%. A difference between an average grain size of the central region of the top side of the final metallic ribbon and an average grain size of an edge portion of the top side of the final metallic ribbon is less than 10%, or preferably less than 5%. A difference between an average grain size of the central region of the bottom side of the final metallic ribbon and an average grain size of an edge portion of the bottom side of the final metallic ribbon may be less than 5 nm, or preferably less than 2 nm. A difference between an average grain size of the central region of the top side of the final metallic ribbon and an average grain size of an edge portion of the top side of the final metallic ribbon may be less than 5 nm, or preferably less than 2 nm. The first coolant delivered to at least the central region of the top side and/or bottom side of the preliminary metallic ribbon may include a stream of liquid argon, liquid helium, and/or one or more other noble gas in liquid state. The grain size refinement and uniformity process may include directly delivering the first coolant to at least the central region of the top side and/or bottom side of the preliminary metallic ribbon. The grain size refinement and uniformity process may include directly delivering the first coolant to the top side and the bottom side of the preliminary metallic ribbon. A flow rate of the molten mixture of alloys provided to the rotatable wheel may be at least 10% greater than a conventional flow rate; the rapid solidifying includes rotating the rotatable wheel at a first wheel speed; an average grain size of a central portion of the final metallic ribbon is at least 5% less than a conventional average grain size of a central portion of a conventional metallic ribbon produced using a conventional method; the conventional flow rate is a maximum flow rate used in the conventional method for producing the conventional metallic ribbon; and the conventional method includes providing the molten mixture of alloys to the rotatable wheel rotating at the first wheel speed and not performing the grain size refinement and uniformity process. The flow rate of the molten mixture of alloys provided to the rotatable wheel may be at least 30% greater than the conventional flow rate; and the average grain size of the central portion of the final metallic ribbon is at least 10% less than the conventional average grain size of the central portion of the conventional metallic ribbon produced using the conventional method. The mixture of alloys may include RE-Fe—Co-M-B, wherein RE is one or more rare earth elements, and wherein M is one or more elements selected from the elements Ga, Cu, Al, Nb, Zr, W, Ti, Si, C, and Mo.

In another exemplary embodiment, a method of producing magnetic material is described. The method includes providing a mixture of alloys; and melting the mixture of alloys to arrive at a molten mixture of alloys; and performing a melt-spinning process to rapidly solidify the molten mixture of alloys via a rotatable wheel to arrive at a preliminary metallic ribbon. The preliminary metallic ribbon having an elongated flat body with a bottom side and a top side, the top side opposite to the bottom side. The method includes performing a grain size refinement and uniformity process, the grain size refinement and uniformity process including delivering a first coolant directly to at least a central region of the top side and/or bottom side of the preliminary metallic ribbon to arrive at a final metallic ribbon. An average grain size of a central portion of the final metallic ribbon is at least 5% less than an average grain size of a central portion of a conventional metallic ribbon produced using a conventional method. The conventional method includes performing the rapid solidifying of the molten mixture of alloys using the rotatable wheel and not performing the grain size refinement and uniformity process.

The average grain size of the central portion of the final metallic ribbon may be at least 10% less than the average grain size of the central portion of the conventional metallic ribbon produced using the conventional method. The first coolant delivered to at least the central region of the top side and/or bottom side of the preliminary metallic ribbon may include a stream of liquid argon, liquid helium, and/or one or more other noble gas in liquid state. The grain size refinement and uniformity process may include directly delivering the first coolant to at least the central region of the top side and/or bottom side of the preliminary metallic ribbon. The grain size refinement and uniformity process may include directly delivering the first coolant to the top side and the bottom side of the preliminary metallic ribbon. A flow rate of the molten mixture of alloys provided to the rotatable wheel may be at least 10% greater than a conventional flow rate; and the rapid solidifying includes rotating the rotatable wheel at a first wheel speed; and the conventional flow rate is a maximum flow rate used in the conventional method for producing the conventional metallic ribbon. The flow rate of the molten mixture of alloys provided to the rotatable wheel may be at least 30% greater than the conventional flow rate. A difference between an average grain size of a central portion of the final metallic ribbon and an average grain size of an edge portion of the final metallic ribbon may be less than 10%, or 5%. A difference between an average grain size of a central portion of the final metallic ribbon and an average grain size of both edge portions of the final metallic ribbon may be less than 10%, or 5%. The mixture of alloys may include RE-Fe—Co-M-B, wherein RE is one or more rare earth elements, and wherein M is one or more elements selected from the elements Ga, Cu, Al, Nb, Zr, W, Ti, Si, C, and Mo.

In an example embodiment, a magnetic material is described. The magnetic material is obtained by one or more example embodiments described above. The magnetic material has an average grain size of a central portion of the final metallic ribbon of at least 5% less than the conventional average grain size of a central portion of a conventional metallic ribbon produced using the conventional method. The conventional method includes performing the melt-spinning process to the rapidly solidify the molten mixture of alloys using the rotatable wheel and not performing the grain size refinement and uniformity process. The average grain size of a central portion of the final metallic ribbon may be at least 10% less than the conventional average grain size of the central portion of the conventional metallic ribbon produced using the conventional method. A difference between an average grain size of a central portion of the final metallic ribbon and an average grain size of an edge portion of the final metallic ribbon may be less than 5 nm, preferably less than 2 nm. A difference between an average grain size of a central portion of the final metallic ribbon and an average grain size of both edge portion of the final metallic ribbon may be less than 5 nm, preferably less than 2 nm. A difference between an average grain size of a central portion of the final metallic ribbon and an average grain size of an edge portion of the final metallic ribbon may be less than 10%, preferably less than 5%. A difference between an average grain size of a central portion of the final metallic ribbon and an average grain size of both edge portion of the final metallic ribbon may be less than 10%, or preferably less than 5%. An average grain size of a central portion and/or the edge portion of the final metallic ribbon may be less than 50 nm, or preferably less than 40 nm. The magnetic material may include RE-Fe—CO-M-B. RE is one or more rare earth elements, and M is one or more elements selected from the elements Ga, Cu, Al, Nb, Zr, W, Ti, Si, C, and Mo.

In another exemplary example, a system for producing magnetic material is described. The system may include a crucible for melting a mixture of alloy to a molten mixture; a pressure source for applying a pressure so as to eject a molten mixture from the crucible onto a rotating wheel, which forms a metallic ribbon; and a nozzle for delivering a coolant directly onto at least a central region of a top side and/or a bottom side of the metallic ribbon. The rotating wheel may be configured for a rapid solidification process and producing a metallic ribbon. The first coolant may include a stream of liquid argon, liquid helium, and/or one or more other inert gas in liquid state.

BRIEF DESCRIPTION OF THE FIGURES

For a more complete understanding of the present disclosure, example embodiments, and their advantages, reference is now made to the following description taken in conjunction with the accompanying Figures, in which like reference numbers indicate like features, and.

Although similar reference numbers may be used to refer to similar elements in the Figures for convenience, it can be appreciated that each of the various example embodiments may be considered to be distinct variations.

Figure 1:
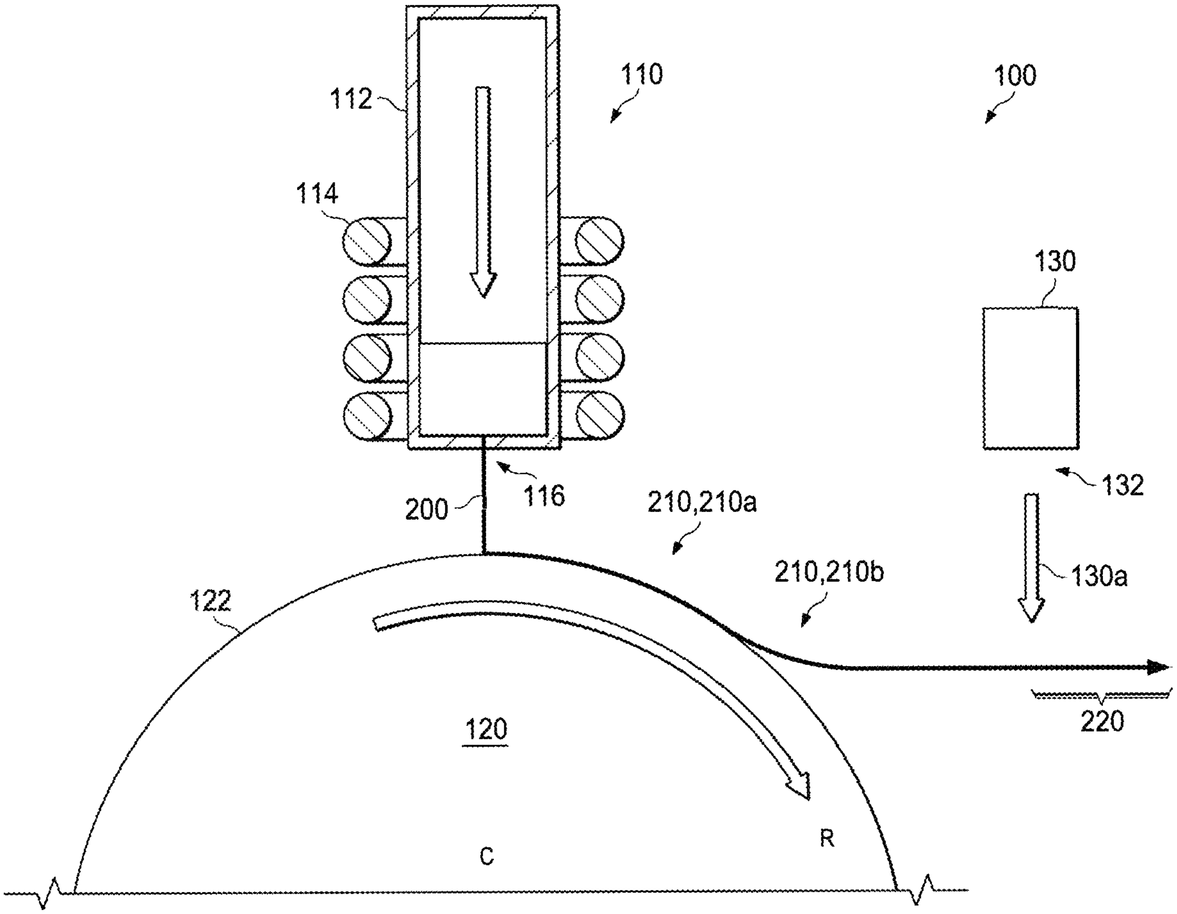
FIG. 1 illustrates an example embodiment of a system for producing magnetic materials.

Example embodiments will now be described with reference to the accompanying Figures, which form a part of the present disclosure and which illustrate example embodiments which may be practiced. As used in the present disclosure and the appended claims, the terms "embodiment," "example embodiment," "exemplary embodiment," and "present embodiment" do not necessarily refer to a single embodiment, although they may, and various example embodiments may be readily combined and/or interchanged without departing from the scope or spirit of example embodiments. Furthermore, the terminology as used in the present disclosure and the appended claims is for the purpose of describing example embodiments only and is not intended to be limitations. In this respect, as used in the present disclosure and the appended claims, the term "in" may include "in" and "on," and the terms "a," "an," and "the" may include singular and plural references. Furthermore, as used in the present disclosure and the appended claims, the term "by" may also mean "from," depending on the context. Furthermore, as used in the present disclosure and the appended claims, the term "if" may also mean "when" or "upon," depending on the context. Furthermore, as used in the present disclosure and appended claims, the words "and/or" may refer to and encompass any or all possible combinations of one or more of the associated listed items.

DETAILED DESCRIPTION

When producing magnetic materials using conventional melt-spinning processes and systems, a metallic ribbon is formed by rapidly solidifying (or rapidly quenching) a molten mixture of alloys. Such metallic ribbons have very fine, nano-scaled grain sizes. A fine and uniform grain size throughout the metallic ribbon is critical to the magnetic properties (e.g., remanence and coercivity) of the final magnet produced by such metallic ribbons, regardless of the process used to form the magnet from the metallic ribbon.

Conventional melt-spinning processes and systems are generally unable to achieve uniform grain sizes for the metallic ribbon, especially across a width of the metallic ribbon. More specifically, average grain sizes in the center areas (e.g., see 212*b* and 211*b* in FIG. 2A) of metallic ribbons formed using conventional melt-spinning processes are larger than average grain sizes in the sides (and/or edges) (e.g., see 212*a*, 212*c*, 211*a*, and 211*c* in FIG. 2A) of the metallic ribbon, thereby resulting in non-uniform grain sizes in the metallic ribbon. It is recognized in the present disclosure that such variations in average grain sizes are a direct result of the center areas receiving less cooling than the sides (and/or edges) during the rapid solidification process.

Present example embodiments relate generally to and/or include methods, systems, methods and products for addressing industrial problems, including those described above and in the present disclosure, and more specifically, example embodiments relate to methods, systems, methods for producing magnetic material, and the obtained magnetic material. As further described in the present disclosure, example embodiments offer various technical advantages and/or improvements over conventional methods.

It is to be understood that, while example embodiments are mostly described in the present disclosure as pertaining to the use of liquid noble gas as a coolant, the principles described in the present disclosure may also be applied beyond the context of liquid noble gases, such as the use of gaseous noble gases, liquid or gaseous inert gases, without departing from the teachings of the present disclosure.

Example embodiments will now be described below with reference to the accompanying Figures, which form a part of the present disclosure.

Example Embodiments of a System for Producing Magnetic Material (e.g., System 100)

FIG. 1 illustrates an example embodiment of a system (e.g., system 100) for producing magnetic material. The system 100 for producing magnetic material includes a rotating wheel assembly 120, such as a melt-spinning system with a rotatable wheel. The system 100 also includes a crucible assembly 110 for receiving and melting a mixture of alloys, and providing the molten mixture of alloys 200 (or molten metal alloys 200) to a surface 122 of the rotatable wheel of the rotating wheel assembly 120. The system 100 also includes a grain size refinement and uniformity assembly 130 for use in controlling grain size refinement and uniformity across a width of the metallic ribbon produced by the rapid solidification of the molten mixture of alloys via the rotating wheel of the rotating wheel assembly 120. The system 100 also includes a chamber (not shown), or the like, for housing the crucible assembly 110, rotating wheel assembly 120, and grain size refinement and uniformity assembly 130 and for maintaining a consistent environment/condition for the production of magnetic material. For example, during the production of magnetic material, an internal pressure and temperature of the chamber may be maintained to be between about 200 mTorr to 805 Torr and between about 10° C. to 200° C., respectively. Furthermore, the chamber may receive and maintain an atmosphere of one or more inert gases (e.g., argon gas, helium gas, or the like) via one or more input and/or output valves. In this regard, the chamber also dynamically maintains the above-mentioned environment/conditions during the production of magnetic material and in view of the application/delivery of coolant 130*a* by the grain size refinement and uniformity assembly 130 (as described in the present disclosure).

Example embodiments of the system 100 for producing magnetic material and elements thereof will now be further described with reference to the accompanying figures, which form a part of the present disclosure.

Crucible Assembly (e.g., Crucible Assembly 110).

As illustrated in FIG. 1, an example embodiment of the system 100 for producing magnetic material includes a crucible assembly (e.g., crucible assembly 110) for receiving and melting a mixture of alloys, and for providing the molten mixture of alloys to the rotating wheel assembly 120.

The crucible assembly 110 includes a crucible (e.g., crucible 112), or the like. The crucible 112 may be formed as a body 112 having an interior cavity for receiving and housing a mixture of alloys. For example, the crucible 112 may be formed as a cylindrical body with a circular cross-section.

The crucible assembly 110 also includes a heating coil (e.g., heating coil 114), or the like, provided in and/or on the crucible 112 in such a way as to provide heating to the interior cavity of the crucible 112. In example embodiments, the heating coil 114 may be an inductive heating coil 114, or the like, configured to provide sufficient heating to melt a mixture of alloys (i.e., to arrive at molten mixture of alloys) when the mixture of alloys is housed in the interior cavity of the crucible 112.

To enable the crucible assembly 110 to eject the molten mixture of alloys 200 from the interior cavity of the crucible 112 to the rotating wheel assembly 120, the crucible assembly 110 includes a nozzle (e.g., nozzle 116), or the like, provided at an end of the crucible 112. In example embodiments, the molten mixture of alloys 200 in the crucible 112 may be selectively pressurized so as to enable the ejection of the molten mixture of alloys 200 from the nozzle 116 at a flow rate of between about 0.2 kg/min to 5.0 kg/min. It is to be understood in the present disclosure that the pressure applied to the molten mixture of alloys 200 in the crucible 112 so as to eject the molten mixture of alloys 200 from the nozzle 116 may be provided using any method and/or device including, but not limited to, a positive pressure source, gravity (e.g., applying pressure to downstream molten mixture of alloys 200 near the nozzle 116 via gravity, that is, via weight of upstream molten mixture of alloys 200 flowing down towards the nozzle 116), etc.

In example embodiments, a composition of the mixture of alloys that is ejected as the molten mixture of alloys 200 by the nozzle 116 of the crucible assembly 110 may include, but is not limited to, a composition represented by RE-Fe—B, where RE is one or more rare earth elements; Fe is iron; and B is boron. In preferred embodiments, the composition of the mixture of alloys is RE-Fe—Co-M-B, where RE is one or more rare earth elements; Fe is iron; Co is cobalt; M is one or more elements selected from the elements Ga, Cu, Al, Nb, Zr, W, Ti, Si, C, and Mo; and B is boron.

Rotating Wheel Assembly (e.g., Rotating Wheel Assembly 120).

As illustrated in FIG. 1, an example embodiment of the system 100 for producing magnetic material includes a rotating wheel assembly (e.g., rotating wheel assembly 120). The rotating wheel assembly 120 includes a rotating wheel 120, or the like, having an outer contact surface (e.g., contact surface 122) configured to rapidly solidify (or rapidly quench) the molten mixture of alloys 200 ejected by the nozzle 116 of the crucible assembly 110. The rotating wheel 120 of the rotating wheel assembly 120 is configured to rotate relative to a central axis C of the rotating wheel 120 (e.g., as illustrated by the directional arrow R in FIG. 1) at a rotational speed (or wheel speed) of between about 5 m/s to 60 m/s. The rotational speed of the rotating wheel 120 may be selected based on, among other things, the flow rate of the molten mixture of alloys 200 from the nozzle 116, the size of the opening of the nozzle 116, the amount of positive pressure applied to the molten mixture of alloys 200 housed in the interior cavity of the crucible 112, the composition and the temperature of the mixture of alloys provided into the interior cavity of the crucible 112, and/or the desired size/dimension(s) (e.g., width, thickness, etc.) of the preliminary metallic ribbon 210 formed by the rotating wheel assembly 120.

As used in the present disclosure, the metallic ribbon 210 formed by the rapid solidification of the molten mixture of alloys 200 by the contact surface 122 of the rotating wheel assembly 120 prior to being treated by the grain size refinement and uniformity assembly 120 (as described in the present disclosure) is referred to as a "preliminary metallic ribbon" 210.

Grain Size Refinement and Uniformity Assembly (e.g., Grain Size Refinement and Uniformity Assembly 130).

In an example embodiment, the system 100 for producing magnetic material includes a grain size refinement and uniformity assembly (e.g., grain size refinement and uniformity assembly 130). The grain size refinement and uniformity assembly 130 may include any assembly and/or elements configurable or configured to deliver an example embodiment of a coolant (e.g., coolant 130*a*) from a coolant source (not shown) to one or more parts of the preliminary metallic ribbon 210 (as formed by the rapid solidification of the molten mixture of alloys 200 (as described above and in the present disclosure)). As used in the present disclosure, the metallic ribbon 210 formed by rapid solidification of molten mixture of alloys 200 that has not (or not yet) received the coolant 130*a* from the grain size refinement and uniformity assembly 130 is referred to as the preliminary metallic ribbon 210. Furthermore, as used in the present disclosure, the preliminary metallic ribbon 210 that has received the coolant 130*a* from the grain size refinement and uniformity assembly 130 (i.e., has been treated by the grain size refinement and uniformity assembly 130) is referred to as a "final metallic ribbon" 220. Put differently, the preliminary metallic ribbon 210 becomes the final metallic ribbon 220 after the preliminary metallic ribbon 210 receives the coolant 130*a* from the grain size refinement and uniformity assembly 130. It is to be understood in the present disclosure that the metallic ribbon formed by the rapid solidification of the molten mixture of alloys 200 may be a long metallic ribbon having portions that are the preliminary metallic ribbon 210 and portions that are the final metallic ribbon 220. For example, the metallic ribbon illustrated in FIG. 1 has a portion 210*a* in contact with the outer contact surface 122 of the rotating wheel 120 (this portion of the metallic ribbon is considered as the preliminary metallic ribbon 210), a portion 210*b* that has left the rotating wheel 120 and has not yet received the coolant 130*a* (this portion of the metallic ribbon is also considered as the preliminary metallic ribbon 210), and a portion that has received the coolant 130*a* (this portion of the metallic ribbon is called the final metallic ribbon 220).

Figure 2A:
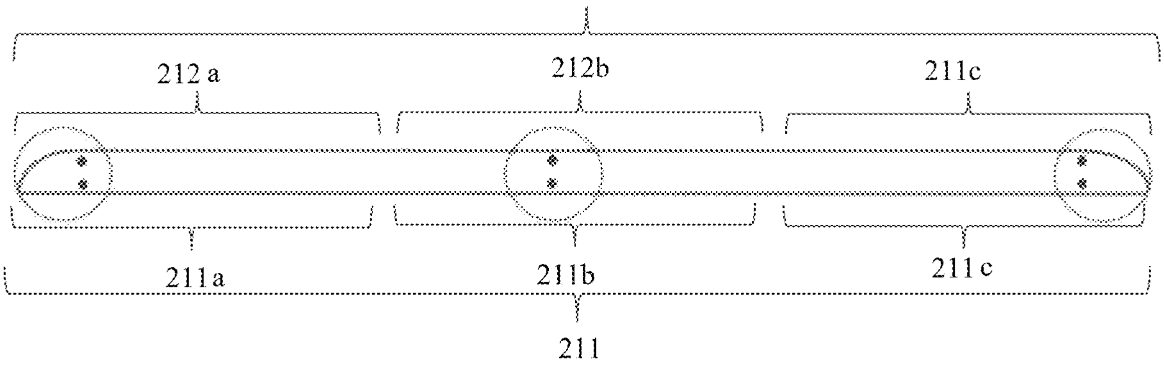
FIG. 2A illustrates a cross-sectional view of an example preliminary metallic ribbon.

FIG. 2A illustrates a cross-sectional view of an example preliminary metallic ribbon 210. The preliminary metallic ribbon 210 includes a top surface 212 (or top side 212) and a bottom surface 211 (or bottom side 211), wherein the bottom surface 211 is the surface or side of the preliminary metallic ribbon 210 that was in direct contact with the outer contact surface 122 of the rotating wheel 120 (or is still in contact with the outer contact surface 122 of the rotating wheel 120 if the preliminary metallic ribbon 210 has not yet left the rotating wheel 120). The top surface 212 of the preliminary metallic ribbon 210 includes a top left surface 212*a* (or top left side 212*a*), a top center surface 212*b* (or top center side 212*b*), and a top right surface 212*c* or (or top right side 212*c*). The bottom surface 211 of the preliminary metallic ribbon 210 includes a bottom left surface 211*a* (or bottom left side 211*a*), a bottom center surface 211*b* (or bottom center side 211*b*), and a bottom right surface 211*c* (or bottom right side 211*c*). The preliminary metallic ribbon 210 leaves the contact surface 122 of the rotating wheel assembly 120 for further treatment by the grain size refinement and uniformity assembly 130.

Figure 2B:
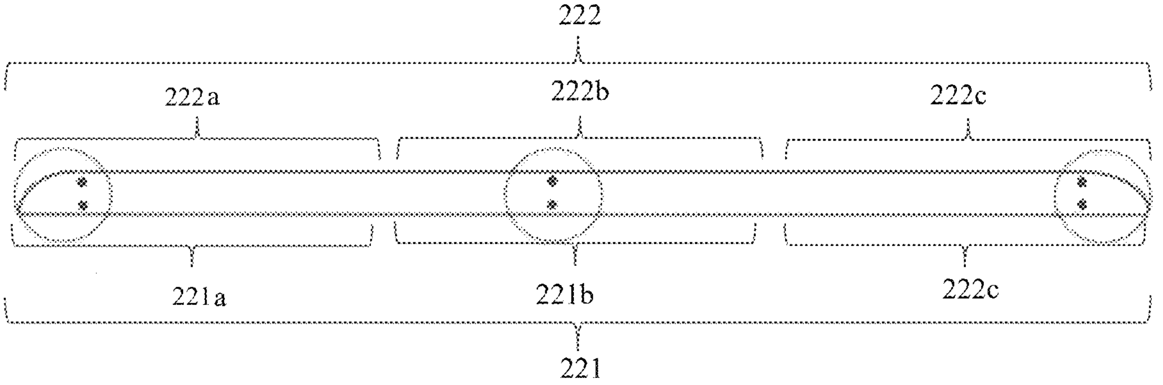
FIG. 2B illustrates a cross-sectional view of an example final metallic ribbon.

FIG. 2B illustrates a cross-sectional view of an example embodiment of the final metallic ribbon 220 having a top surface 222 (or top side 222) and a bottom surface 221 (or bottom side 221), wherein the bottom surface 221 is the surface or side of the final metallic ribbon 220 that was in direct contact with the outer contact surface 122 of the rotating wheel 120 (or is still in contact with the outer contact surface 122 of the rotating wheel 120 if it has not yet left the rotating wheel 120, and has received the coolant 130*a*). The top surface 222 of the final metallic ribbon 220 includes a top left surface 222*a* (or top left side 222*a*), a top center surface 222*b* (or top center side 222*b*), and a top right surface 222*c* or (or top right side 222*c*). The bottom surface 221 of the final metallic ribbon 220 includes a bottom left surface 221*a* (or bottom left side 221*a*), a bottom center surface 221*b* (or bottom center side 221*b*), and a bottom right surface 221*c* (or bottom right side 221*c*).

The grain size refinement and uniformity assembly 130 may include one or more nozzles (e.g., nozzles 132), or the like, in communication with a coolant source (not shown). In example embodiments, the one or more nozzles 132 is configured to deliver the coolant 130*a* to the preliminary metallic ribbon 210. As a more specific example, the grain size refinement and uniformity assembly 130 may include one or more nozzles 132, or the like, configured in such a way as to deliver one or more streams of coolant 130*a* to at least a portion of the top surface 212 of the preliminary metallic ribbon 210. One or more nozzles 132 may be configured so as to uniformly distribute the coolant 130*a* to at least a portion of a top left side or surface 212*a* (as illustrated in FIG. 2A), a top right side or surface 212*c* (as illustrated in FIG. 2A), and a top center side or surface 212*b* (as illustrated in FIG. 2A) of the preliminary metallic ribbon 210 so as to arrive at the final metallic ribbon 220. In example embodiments where a width (i.e., a dimension between a leftmost part/edge of the top left side 212*a* and a rightmost part/edge of the top right side 212*c*) of the preliminary metallic ribbon 210 is small (e.g., less than about 3 mm), the grain size refinement and uniformity assembly 130 may be configured with a single nozzle 132 for delivering a single stream of coolant 130*a* to the top surface 212 of the preliminary metallic ribbon 210. One or more nozzles 132 may be fixedly positioned to deliver the coolant 130*a* to at least a portion 210*b* of the preliminary metallic ribbon 210 that has left (or is no longer in contact with) the contact surface 122 of the rotating wheel 120 (as illustrated in FIG. 1). Such one or more nozzles 132 may be fixedly positioned at a distance of less than 50 mm from the top surface 212 of the preliminary metallic ribbon 210 and when the preliminary metallic ribbon 210 is between about 5 mm to 600 mm away from the contact surface 122 of the rotating wheel 120. Alternatively or in addition, one or more nozzles 132 may be fixedly positioned to deliver the coolant 130*a* to at least a portion 210*a* of the preliminary metallic ribbon 210 that has not yet left (or is still in contact with) the contact surface 122 of the rotating wheel 120. Such one or more nozzles 132 may be fixedly positioned at a distance of less than 50 mm from the top surface 212 of the preliminary metallic ribbon 210.

Alternatively or in addition to the one or more nozzles 132 configured to deliver the coolant 130*a* to at least a portion of the top surface 212 of the preliminary metallic ribbon 210, the grain size refinement and uniformity assembly 130 may include one or more nozzles 132, or the like, configured in such a way as to deliver one or more streams of coolant 130*a* to at least a portion of a bottom surface 211 of the preliminary metallic ribbon 210. The bottom surface 211 of the preliminary metallic ribbon 210 is the surface or side that is opposite to the top surface 212 of the preliminary metallic ribbon 210. One or more such nozzles 132 may be configured so as to uniformly distribute the coolant 130*a* to at least a bottom left side or surface 211*a* (as illustrated in FIG. 2A), a bottom right side or surface 211*c* (as illustrated in FIG. 2A), and a bottom center side or surface 211*b* (as illustrated in FIG. 2A) of the preliminary metallic ribbon 210. In example embodiments where a width (i.e., a dimension between a leftmost part/edge of the bottom left side or surface 211*a* and a rightmost part/edge of the bottom right side or surface 211*c*) of the preliminary metallic ribbon 210 is small (e.g., less than about 3 mm), the grain size refinement and uniformity assembly 130 may be configured with a single nozzle 132 delivering a single stream of coolant 130*a* to the bottom surface 211 of the preliminary metallic ribbon 210. One or more nozzles 132 may be fixedly positioned to deliver the coolant 130*a* to at least a portion of the preliminary metallic ribbon 210 that has left (or is no longer in contact with) the contact surface 122 of the rotating wheel 120 (as illustrated in FIG. 1). Such one or more nozzles 132 may be fixedly positioned at a distance of less than 50 mm from the bottom surface 211 of the preliminary metallic ribbon 210 and when the preliminary metallic ribbon 210 is between about 5 mm to 600 mm away from the contact surface 122 of the rotating wheel 120.

In example embodiments, the coolant 130*a* delivered by the grain size refinement and uniformity assembly 130 to the preliminary metallic ribbon 210 may be in the form of a stream of liquid argon 130*a*, liquid helium 130*a*, and/or one or more other noble gases 130*a* in liquid form (or liquid state). In this regard, the preliminary metallic ribbon 210 receives and comes into contact with a stream of liquid argon 130*a*, liquid helium 130*a*, and/or one or more other noble gases 130*a* in liquid state/form (i.e., receives and comes into contact with a liquid state/form of one or more noble gases 130*a*, such as liquid argon 130*a*). Such stream of liquid state/form of one or more noble gases 130*a* may be delivered at a flow rate of between about 20-500 cc/min. Alternatively or in addition to delivering a stream of a liquid state/form of one or more noble gases 130*a*, the coolant 130*a* delivered by the grain size refinement and uniformity assembly 130 to the preliminary metallic ribbon 210 may be a stream or flow of gaseous state/form of argon gas, helium gas, and/or one or more other noble gases.

It is recognized in the present disclosure that in delivering of example embodiments of the coolant 130*a* to the preliminary metallic ribbon 210 by example embodiments of the grain size refinement and uniformity assembly 130 (as compared to not treating the preliminary metallic ribbon 210 with the grain size refinement and uniformity assembly 130, including not delivering the coolant 130*a*), the final metallic ribbon 220 is formed having a more uniform grain size refinement and uniformity across a width of the top side 222 and/or bottom side 221 of the final metallic ribbon 220 (i.e., more or increased uniformity of grain sizes for the top left side 222*a*, top right side 222*c*, top center side 222*b*, bottom left side 221*a*, bottom right side 222*c*, and bottom center side 222*b*). As used in the present disclosure, a more or increased uniformity of grain sizes refers to a smaller deviation, range, or difference of grain sizes. For example, a preliminary metallic ribbon 210 with an average grain size in the left side 211*a*/212*a* of 43.5 nm, average grain size in the center 211*b*/212*b* of 46.9 nm, and average grain size in the right side 211*c*/212*c* of 39.1 nm would have less uniformity of grain sizes (or less uniform grain sizes across a width) as compared to a final metallic ribbon 220 with an average grain size in the left side 221*a*/222*a* of 38.1 nm, average grain size in the center 221*b*/222*b* of 39.1 nm, and average grain size in the right side 221*c*/222*c* of 37.7 nm.

More specifically, it is recognized in the present disclosure that in delivering of example embodiments of the coolant 130*a* to the preliminary metallic ribbon 210 by example embodiments of the grain size refinement and uniformity assembly 120 (as compared to not treating the preliminary metallic ribbon 210 with the grain size refinement and uniformity assembly 130, including not delivering the coolant 130*a*), the final metallic ribbon 220 is formed such that a difference between an average grain size of a central portion 221*b*/222*b* of the final metallic ribbon 220 and an average grain size of one or more side or edge portions (221*a*, 221*c*, 222*a*, and/or 222*c*) of the final metallic ribbon 220 is less than 10% of the average grain size of the side or edge portion (221*a*, 221*c*, 222*a*, and/or 222*c*) of the final metallic ribbon 220. Preferably, the final metallic ribbon 220 is formed such that a difference between an average grain size of a central portion 221*b*/222*b* of the final metallic ribbon 220 and an average grain size of every side or edge portions (221*a*, 221*c*, 222*a*, and 222*c*) of the final metallic ribbon 220 (i.e., as compared to every side or edge portion of the final metallic ribbon 220) is less than 10% of the average grain size of every side or edge portion (221*a*, 221*c*, 222*a*, and 222*c*) of the final metallic ribbon 220. Preferably, the final metallic ribbon 220 is formed such that a difference between an average grain size of a central portion 221*b*/222*b* of the final metallic ribbon 220 and an average grain size of one or more side or edge portions (221*a*, 221*c*, 222*a*, and/or 222*c*) of the final metallic ribbon 220 is less than 5% of the average grain size of the side or edge portion (221*a*, 221*c*, 222*a*, and/or 222*c*) of the final metallic ribbon 220. Preferably, the final metallic ribbon 220 is formed such that a difference between an average grain size of a central portion 221*b*/222*b* of the final metallic ribbon 220 and an average grain size of every side or edge portions (221*a*, 221*c*, 222*a*, and 222*c*) of the final metallic ribbon 220 is less than 5% of the average grain size of every side or edge portion (221*a*, 221*c*, 222*a*, and 222*c*) of the final metallic ribbon 220.

Alternatively or in addition, when example embodiments of the coolant 130*a* are delivered to the preliminary metallic ribbon 210 by example embodiments of the grain size refinement and uniformity assembly 130 (as compared to not treating the preliminary metallic ribbon 210 with the grain size refinement and uniformity assembly 130, including not delivering the coolant 130*a*), the final metallic ribbon 220 is formed such that a difference between an average grain size of a central portion 221*b*/222*b* of the final metallic ribbon 220 and an average grain size of a side or edge portion (221*a*, 221*c*, 222*a*, and/or 222*c*) of the final metallic ribbon 220 is less than 5 nm. Preferably, the final metallic ribbon 220 is formed such that a difference between an average grain size of a central portion 221*b*/222*b* of the final metallic ribbon 220 and an average grain size of every side or edge portions (221*a*, 221*c*, 222*a*, and 222*c*) of the final metallic ribbon 220 (i.e., as compared to every side or edge portion of the final metallic ribbon 220) is less than 5 nm. Preferably, the final metallic ribbon 220 is formed such that a difference between an average grain size of a central portion 221*b*/222*b* of the final metallic ribbon 220 and an average grain size of a side or edge portion (221*a*, 221*c*, 222*a*, and/or 222*c*) of the final metallic ribbon 220 is less than 2 nm. Preferably, the final metallic ribbon 220 is formed such that a difference between an average grain size of a central portion 221*b*/222*b* of the final metallic ribbon 220 and an average grain size of every side or edge portions (221*a*, 221*c*, 222*a*, and 222*c*) of the final metallic ribbon 220 is less than 2 nm.

Alternatively or in addition, when example embodiments of the coolant 130*a* are delivered to the preliminary metallic ribbon 210 by example embodiments of the grain size refinement and uniformity assembly 130 (as compared to not treating the preliminary metallic ribbon 210 with the grain size refinement and uniformity assembly 130, including not delivering the coolant 130*a*), the final metallic ribbon 220 is formed such that an average grain size of a central portion 221*b*/222*b* of the final metallic ribbon 220 is less than 50 nm. Preferably, the final metallic ribbon 220 is formed such that an average grain size of a central portion 221*b*/222*b* of the final metallic ribbon 220 of the final metallic ribbon 220 is less than 40 nm. Preferably, the final metallic ribbon 220 is formed such that an average grain size of a central portion 221*b*/222*b* and an average grain size of every side or edge portion (221*a*, 221*c*, 222*a*, and 222*c*) of the final metallic ribbon 220 is less than 50 nm. Preferably, the final metallic ribbon 220 is formed such that an average grain size of a central portion 221*b*/222*b* of the final metallic ribbon 220 and an average grain size of every side or edge portion (221*a*, 221*c*, 222*a*, and 222*c*) of the final metallic ribbon 220 is less than 40 nm.

It is also recognized in the present disclosure that in delivering of example embodiments of the coolant 130*a* to the preliminary metallic ribbon 210 by example embodiments of the grain size refinement and uniformity assembly 130 (as compared to not treating the preliminary metallic ribbon 210 with the grain size refinement and uniformity assembly 130, including not delivering the coolant 130*a*), the final metallic ribbon 220 is formed having an average grain size of a central portion 221*b*/222*b* to be smaller than a conventional average grain size of a central portion of a conventional metallic ribbon produced using a conventional method. For example, the final metallic ribbon 220 is formed having an average grain size of a central portion 221*b*/222*b* to be at least 5% less than a conventional average grain size of a central portion of a conventional metallic ribbon produced using a conventional method. Preferably, the final metallic ribbon 220 is formed having an average grain size of a central portion 221*b*/222*b* to be at least 10% less than the conventional average grain size of the central portion of the conventional metallic ribbon produced using the conventional method. As referred to in the present disclosure, a "conventional method", or the like, may be any method of producing a metallic ribbon that does not include the use of example embodiments of the grain size refinement and uniformity assembly 130 to treat the preliminary metallic ribbon 210 (i.e., conventional methods do not deliver an example embodiment of the coolant 130*a* to a preliminary metallic ribbon 210). Furthermore, as referred to in the present disclosure, a "conventional metallic ribbon", or the like, may be any metallic ribbon (including the preliminary metallic ribbon 210) produced without using example embodiments of the grain size refinement and uniformity assembly 130 to treat the preliminary metallic ribbon 210 (i.e., conventional metallic ribbons have not been treated with example embodiments of the coolant 130*a*). Furthermore, as referred to in the present disclosure, a "central portion of a conventional metallic ribbon", or the like, may be a central portion of any metallic ribbon (including the central portion of the preliminary metallic ribbon 210) produced without using example embodiments of the grain size refinement and uniformity assembly 130 to treat the preliminary metallic ribbon 210 (i.e., central portion of conventional metallic ribbons that have not been treated with example embodiments of the coolant 130*a*).

It is also recognized in the present disclosure that in delivering of example embodiments of the coolant 130*a* to the preliminary metallic ribbon 210 by example embodiments of the grain size refinement and uniformity assembly 130 (as compared to not treating the preliminary metallic ribbon 210 with the grain size refinement and uniformity assembly 130, including not delivering the coolant 130*a*), the flow rate of the molten mixture of alloys 200 provided to the outer contact surface 122 of the rotating wheel 120 (which is rotating at a first rotation speed or first wheel speed) may be increased by at least 10% higher than a conventional flow rate of the molten mixture of alloys 200 used in conventional methods. As referred to in the present disclosure, a "conventional flow rate" of a molten mixture of alloys 200 is a maximum flow rate of a molten mixture of alloys 200 provided to the outer contact surface 122 of the rotating wheel 120 (which is rotating at a first rotation speed or first wheel speed) using a conventional method (which, as described in the present disclosure is one that does not include using example embodiments of the grain size refinement and uniformity assembly 130 to treat the preliminary metallic ribbon 210 (i.e., conventional methods do not deliver an example embodiment of the coolant 130*a* to a preliminary metallic ribbon 210)). Preferably, an average grain size of a central portion of the final metallic ribbon 220 produced as a result of the above-mentioned increased flow rate of 10% of the molten mixture of alloys 200 (as compared to conventional flow rates) is at least 5% less than a conventional average grain size of a central portion of a conventional metallic ribbon produced using the above-mentioned conventional method (and above-mentioned conventional flow rate). Preferably, an average grain size of a central portion of the final metallic ribbon 220 produced as a result of the above-mentioned increased flow rate of 10% of the molten mixture of alloys 200 (as compared to conventional flow rates) is at least 10% less than a conventional average grain size of a central portion of a conventional metallic ribbon produced using the above-mentioned conventional method (and above-mentioned conventional flow rate). Preferably, the flow rate of the molten mixture of alloys 200 provided to the outer contact surface 122 of the rotating wheel 120 (which is rotating at a first rotation speed or first wheel speed) may be increased by at least 30% as compared to the above-mentioned conventional flow rate of the molten mixture of alloys 200 used in the above-mentioned conventional methods. Preferably, an average grain size of a central portion of the final metallic ribbon 220 produced as a result of the above-mentioned increased flow rate of 30% of the molten mixture of alloys 200 (as compared to conventional flow rates) is at least 5% less than a conventional average grain size of a central portion of a conventional metallic ribbon produced using the above-mentioned conventional method (and above-mentioned conventional flow rate). Preferably, an average grain size of a central portion of the final metallic ribbon 220 produced as a result of the above-mentioned increased flow rate of 30% of the molten mixture of alloys 200 (as compared to conventional flow rates) is at least 10% less than a conventional average grain size of a central portion of a conventional metallic ribbon produced using the above-mentioned conventional method (and above-mentioned conventional flow rate).

Example Embodiments of a Method of Producing Magnetic Material (e.g., Method 300)

Figure 3:
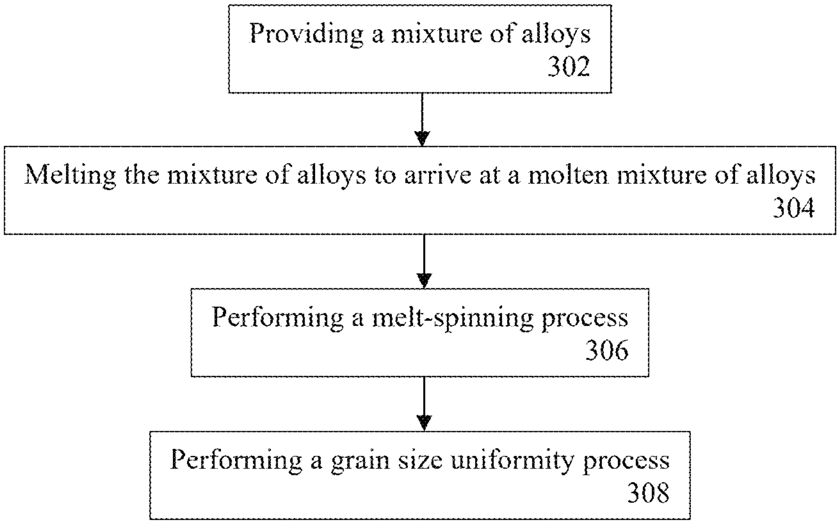
FIG. 3 illustrates an example embodiment of a method of producing magnetic materials.

FIG. 3 illustrates an example embodiment of a method (e.g., method 300) of producing magnetic material. The method 300 of producing magnetic material includes providing a mixture of alloys (e.g., action 302). The method 300 also includes melting the mixture of alloys to arrive at a molten mixture of alloys (e.g., action 304). The method 300 also includes performing a melt-spinning process (e.g., action 306). The melt-spinning process includes rapidly solidifying the molten mixture of alloys, as obtained in action 304, via a rotatable wheel to arrive at a preliminary metallic ribbon (e.g., action 306). The method 300 also includes performing a grain size refinement and uniformity process (e.g., action 308).

In example embodiments, the method 300 may be performed using example embodiments of the system 100 (as described in the present disclosure) or one or more elements of the system 100, including the crucible assembly 110, the rotating wheel assembly 120, and/or the grain size refinement and uniformity assembly 130. Such system 100, or one or more elements of the system 100, may be housed in a chamber (not shown), or the like, configured to maintain a consistent environment/condition for the production of magnetic material. For example, while producing magnetic material, the method 300 may also include maintaining an internal pressure and/or temperature of the chamber to be between about 10 torr to 500 torr and between about 10° C. to 200° C., respectively. Furthermore, the method 300 may also include providing and maintaining, in the chamber, an atmosphere of one or more inert gases (e.g., argon gas, helium gas, or the like), such as via one or more input and/or output valves (not shown). The method 300 may also include dynamically maintaining the above-mentioned environment/conditions in the chamber during the production of magnetic material and in view of the application/delivery of coolant 130*a* (e.g., by the grain size refinement and uniformity assembly 130, as described in the present disclosure) and atmosphere of one or more inert gases.

Example embodiments of the method 300 of producing magnetic material and actions thereof will now be further described with reference to the accompanying figures, which form a part of the present disclosure.

Providing a Mixture of Alloys (e.g., Action 302).

In an example embodiment, the method 300 of producing magnetic material includes providing a mixture of alloys (e.g., action 302). The mixture of alloys may include, but is not limited to, a composition represented by RE-Fe—B, where RE is one or more rare earth elements; Fe is iron; and B is boron. In preferred embodiments, the composition of the mixture of alloys is RE-Fe—Co-M-B, where RE is one or more rare earth elements; Fe is iron; Co is cobalt; M is one or more elements selected from the elements Ga, Cu, Al, Nb, Zr, W, Ti, Si, C, and Mo; and B is boron. The mixture of alloys may be provided into example embodiments of the crucible assembly 110. The mixture of alloys may be provided either in the form of raw materials, including RE, Fe, Co, M, and/or B, and/or in the form of pre-melted ingot (which may include RE, Fe, Co, M, and/or B).

Melting the Mixture of Alloys to Arrive at a Molten Mixture of Alloys (e.g., Action 304).

In an example embodiment, the method 300 of producing magnetic material includes melting the mixture of alloys to arrive at a molten mixture of alloys (e.g., action 304). The mixture of alloys may be melted using example embodiments of the crucible assembly 110 having a heating coil 114, or the like. The heating coil 114 may be an inductive heating coil 114, or the like, configured to provide sufficient heating to melt the mixture of alloys (i.e., to arrive at molten mixture of alloys) when the mixture of alloys is housed in the interior cavity of the crucible 112.

Performing a Melt-Spinning Process (e.g., Action 306).

In an example embodiment, the method 300 of producing magnetic material includes performing a melt-spinning process (e.g., action 306). The melt-spinning process includes rapidly solidifying the molten mixture of alloys (as obtained in action 304 and housed in the crucible 116), using a rotatable wheel to arrive at a preliminary metallic ribbon (e.g., action 306). The method 300 includes ejecting the molten mixture of alloys from the crucible 112 via a nozzle 116, or the like, to an outer contact surface 122 of the rotating wheel 120.

The molten mixture of alloys may be ejected at a flow rate of between about 0.2 kg/min to 5.0 kg/min.

The melt-spinning process includes rotating the rotating wheel 120 of the rotating wheel assembly 120 relative to a central axis C of the rotating wheel 120 (e.g., as illustrated by the directional arrow R in FIG. 1) at a rotational speed (or wheel speed) of between about 5 m/s to 60 m/s. The rotational speed of the rotating wheel 120 may be selected based on, among other things, the flow rate of the molten mixture of alloys from the nozzle 116, the size of the opening of the nozzle 116, the amount of positive pressure applied to the molten mixture of alloys housed in the interior cavity of the crucible 112, the composition and the temperature of the mixture of alloys provided into the interior cavity of the crucible 112, the desired size/dimension(s) (e.g., width, thickness, etc.) of the preliminary metallic ribbon 210 formed by the rotating wheel assembly 120.

When the molten mixture of alloys ejected from the nozzle 116 comes into contact with the outer contact surface 122 of the rotating wheel 120, the molten mixture of alloys is rapidly solidified to produce a preliminary metallic ribbon (as described in the present disclosure).

Performing a Grain Size Refinement and Uniformity Process (e.g., Action 308).

In an example embodiment, the method 300 of producing magnetic material includes performing a grain size refinement and uniformity process (e.g., action 308). The grain size refinement and uniformity process may be performed by example embodiments of the grain size refinement and uniformity assembly 130. The grain size refinement and uniformity process includes delivering an example embodiment of a coolant 130*a* from a coolant source (not shown) to one or more parts of the preliminary metallic ribbon 210 (as formed by the rapid solidification of the molten mixture of alloys (as described above and in the present disclosure)) to arrive at a final metallic ribbon. The coolant 130*a* delivered by the grain size refinement and uniformity process to the preliminary metallic ribbon 210 may be in the form of a stream of liquid argon 130*a*, liquid helium 130*a*, and/or one or more other noble gases 130*a* in liquid form (or liquid state). In this regard, the preliminary metallic ribbon 210 receives and comes into contact with a stream of liquid argon 130*a*, liquid helium 130*a*, and/or one or more other noble gases 130*a* in liquid state/form (i.e., receives and comes into contact with a liquid state/form of one or more noble gases 130*a*, such as liquid argon 130*a*). Such stream of liquid state/form of one or more noble gases 130*a* may be delivered at a flow rate of between about 20-500 cc/min. Alternatively or in addition to delivering a stream of a liquid state/form of one or more noble gases 130*a*, the coolant 130*a* delivered by the grain size refinement and uniformity process to the preliminary metallic ribbon 210 may be a stream or flow of gaseous state/form of argon gas, helium gas, and/or one or more other noble gases.

In example embodiments, the grain size refinement and uniformity process includes delivering, via one or more nozzles 132 of the grain size refinement and uniformity assembly 130, the coolant 130*a* to the preliminary metallic ribbon 210. The one or more nozzles 132 may be configured in such a way as to deliver one or more streams of coolant 130*a* to at least a portion of the top surface 212 of the preliminary metallic ribbon 210. The one or more nozzles 132 may be configured so as to uniformly distribute the coolant 130*a* to at least a portion of a top left side or surface 212*a* (as illustrated in FIG. 2A), a top right side or surface 212*c* (as illustrated in FIG. 2A), and a top center side or surface 212*b* (as illustrated in FIG. 2A) of the preliminary metallic ribbon 210 so as to arrive at the final metallic ribbon 220. In example embodiments where a width (i.e., a dimension between a leftmost part/edge of the top left side 212*a* and a rightmost part/edge of the top right side 212*c*) of the preliminary metallic ribbon 210 is small (e.g., less than about 3 mm), the grain size refinement and uniformity process may utilize a single nozzle 132 for delivering a single stream of coolant 130*a* to the top surface 212 of the preliminary metallic ribbon 210.

In example embodiments, the grain size refinement and uniformity process may deliver the coolant 130*a* to at least a portion 210*b* of the preliminary metallic ribbon 210 that has left (or is no longer in contact with) the contact surface 122 of the rotating wheel 120 (as illustrated in FIG. 1). In such examples, one or more nozzles 132 may be fixedly positioned at a distance of less than 50 mm from the top surface 212 of the preliminary metallic ribbon 210 and when the preliminary metallic ribbon 210 is between about 5 mm to 600 mm away from the contact surface 122 of the rotating wheel 120.

Alternatively or in addition, the grain size refinement and uniformity process may deliver the coolant 130*a* to at least a portion 210*a* of the preliminary metallic ribbon 210 that has not yet left (or is still in contact with) the contact surface 122 of the rotating wheel 120. In such examples, one or more nozzles 132 may be fixedly positioned at a distance of less than 50 mm from the top surface 212 of the preliminary metallic ribbon 210.

Alternatively or in addition to the one or more nozzles 132 configured to deliver the coolant 130*a* to at least a portion of the top surface 212 of the preliminary metallic ribbon 210, the grain size refinement and uniformity process may deliver one or more streams of coolant 130*a* to at least a portion of a bottom surface 211 of the preliminary metallic ribbon 210. In such examples, one or more nozzles 132 may be configured so as to uniformly distribute the coolant 130*a* to at least a bottom left side or surface 211*a* (as illustrated in FIG. 2A), a bottom right side or surface 211*c* (as illustrated in FIG. 2A), and a bottom center side or surface 211*b* (as illustrated in FIG. 2A) of the preliminary metallic ribbon 210. In example embodiments where a width (i.e., a dimension between a leftmost part/edge of the bottom left side or surface 211*a* and a rightmost part/edge of the bottom right side or surface 211*c*) of the preliminary metallic ribbon 210 is small (e.g., less than about 3 mm), the grain size refinement and uniformity process may deliver a single stream of coolant 130*a* to the bottom surface 211 of the preliminary metallic ribbon 210.

In example embodiments, the grain size refinement and uniformity process may deliver the coolant 130*a* to at least a portion of the preliminary metallic ribbon 210 that has left (or is no longer in contact with) the contact surface 122 of the rotating wheel 120 (as illustrated in FIG. 1). In such examples, one or more nozzles 132 may be fixedly positioned at a distance less than 50 mm from the bottom surface 211 of the preliminary metallic ribbon 210 and when the preliminary metallic ribbon 210 is between about 5 mm to 600 mm away from the contact surface 122 of the rotating wheel 120.

It is recognized in the present disclosure that in delivering of example embodiments of the coolant 130*a* to the preliminary metallic ribbon 210 by example embodiments of the grain size refinement and uniformity process (as compared to conventional methods of not treating the preliminary metallic ribbon 210 with the grain size refinement and uniformity process, including not delivering the coolant 130*a*), the final metallic ribbon 220 is formed having a more (or better or greater) grain size refinement and uniformity across a width of the top side 222 and/or bottom side 221 of the final metallic ribbon 220 (i.e., more or increased uniformity of grain sizes for the top left side 222*a*, top right side 222*c*, top center side 222*b*, bottom left side 221*a*, bottom right side 222*c*, and bottom center side 222*b*).

More specifically, it is recognized in the present disclosure that in delivering of example embodiments of the coolant 130*a* to the preliminary metallic ribbon 210 by example embodiments of the grain size refinement and uniformity process (as compared to conventional methods of not treating the preliminary metallic ribbon 210 with the grain size refinement and uniformity process, including not delivering the coolant 130*a*), the final metallic ribbon 220 is formed such that a difference between an average grain size of a central portion 221*b*/222*b* of the final metallic ribbon 220 and an average grain size of one or more side or edge portions (221*a*, 221*c*, 222*a*, and/or 222*c*) of the final metallic ribbon 220 is less than 10% of the average grain size of the side or edge portion (221*a*, 221*c*, 222*a*, and/or 222*c*) of the final metallic ribbon 220. Preferably, the final metallic ribbon 220 is formed such that a difference between an average grain size of a central portion 221*b*/222*b* of the final metallic ribbon 220 and an average grain size of every side or edge portions (221*a*, 221*c*, 222*a*, and 222*c*) of the final metallic ribbon 220 (i.e., as compared to every side or edge portion of the final metallic ribbon 220) is less than 10% of the average grain size of every side or edge portion (221*a*, 221*c*, 222*a*, and 222*c*) of the final metallic ribbon 220. Preferably, the final metallic ribbon 220 is formed such that a difference between an average grain size of a central portion 221*b*/222*b* of the final metallic ribbon 220 and an average grain size of one or more side or edge portions (221*a*, 221*c*, 222*a*, and/or 222*c*) of the final metallic ribbon 220 is less than 5% of the average grain size of the side or edge portion (221*a*, 221*c*, 222*a*, and/or 222*c*) of the final metallic ribbon 220. Preferably, the final metallic ribbon 220 is formed such that a difference between an average grain size of a central portion 221*b*/222*b* of the final metallic ribbon 220 and an average grain size of every side or edge portions (221*a*, 221*c*, 222*a*, and 222*c*) of the final metallic ribbon 220 is less than 5% of the average grain size of every side or edge portion (221*a*, 221*c*, 222*a*, and 222*c*) of the final metallic ribbon 220.

Alternatively or in addition, when example embodiments of the coolant 130*a* are delivered to the preliminary metallic ribbon 210 by example embodiments of the grain size refinement and uniformity process (as compared to conventional methods of not treating the preliminary metallic ribbon 210 with the grain size refinement and uniformity process, including not delivering the coolant 130*a*), the final metallic ribbon 220 is formed such that a difference between an average grain size of a central portion 221*b*/222*b* of the final metallic ribbon 220 and an average grain size of a side or edge portion (221*a*, 221*c*, 222*a*, and/or 222*c*) of the final metallic ribbon 220 is less than 5 nm. Preferably, the final metallic ribbon 220 is formed such that a difference between an average grain size of a central portion 221*b*/222*b* of the final metallic ribbon 220 and an average grain size of every side or edge portions (221*a*, 221*c*, 222*a*, and 222*c*) of the final metallic ribbon 220 (i.e., as compared to every side or edge portion of the final metallic ribbon 220) is less than 5 nm. Preferably, the final metallic ribbon 220 is formed such that a difference between an average grain size of a central portion 221*b*/222*b* of the final metallic ribbon 220 and an average grain size of a side or edge portion (221*a*, 221*c*, 222*a*, and/or 222*c*) of the final metallic ribbon 220 is less than 2 nm. Preferably, the final metallic ribbon 220 is formed such that a difference between an average grain size of a central portion 221*b*/222*b* of the final metallic ribbon 220 and an average grain size of every side or edge portions (221*a*, 221*c*, 222*a*, and 222*c*) of the final metallic ribbon 220 is less than 2 nm.

Alternatively or in addition, when example embodiments of the coolant 130*a* are delivered to the preliminary metallic ribbon 210 by example embodiments of the grain size refinement and uniformity process (as compared to conventional methods of not treating the preliminary metallic ribbon 210 with the grain size refinement and uniformity process, including not delivering the coolant 130*a*), the final metallic ribbon 220 is formed such that an average grain size of a central portion 221*b*/222*b* of the final metallic ribbon 220 is less than 50 nm. Preferably, the final metallic ribbon 220 is formed such that an average grain size of a central portion 221*b*/222*b* of the final metallic ribbon 220 of the final metallic ribbon 220 is less than 40 nm. Preferably, the final metallic ribbon 220 is formed such that an average grain size of a central portion 221*b*/222*b* and an average grain size of every side or edge portion (221*a*, 221*c*, 222*a*, and 222*c*) of the final metallic ribbon 220 is less than 50 nm. Preferably, the final metallic ribbon 220 is formed such that an average grain size of a central portion 221*b*/222*b* of the final metallic ribbon 220 and an average grain size of every side or edge portion (221*a*, 221*c*, 222*a*, and 222*c*) of the final metallic ribbon 220 is less than 40 nm.

It is also recognized in the present disclosure that in delivering of example embodiments of the coolant 130*a* to the preliminary metallic ribbon 210 by example embodiments of the grain size refinement and uniformity process (as compared to conventional methods of not treating the preliminary metallic ribbon 210 with the grain size refinement and uniformity process, including not delivering the coolant 130*a*), the final metallic ribbon 220 is formed having an average grain size of a central portion 221*b*/222*b* to be smaller than a conventional average grain size of a central portion of a conventional metallic ribbon produced using a conventional method. For example, the final metallic ribbon 220 is formed having an average grain size of a central portion 221*b*/222*b* to be at least 5% less than a conventional average grain size of a central portion of a conventional metallic ribbon produced using a conventional method. Preferably, the final metallic ribbon 220 is formed having an average grain size of a central portion 221*b*/222*b* to be at least 10% less than the conventional average grain size of the central portion of the conventional metallic ribbon produced using the conventional method.

It is also recognized in the present disclosure that in delivering of example embodiments of the coolant 130*a* to the preliminary metallic ribbon 210 by example embodiments of the grain size refinement and uniformity process (as compared to conventional methods of not treating the preliminary metallic ribbon 210 with the grain size refinement and uniformity process, including not delivering the coolant 130*a*), the flow rate of the molten mixture of alloys 200 provided to the outer contact surface 122 of the rotating wheel 120 (which is rotating at a first rotation speed or first wheel speed) may be increased by at least 10% higher than a conventional flow rate of the molten mixture of alloys 200 used in conventional methods. Preferably, an average grain size of a central portion of the final metallic ribbon 220 produced as a result of the above-mentioned increased flow rate of 10% of the molten mixture of alloys 200 (as compared to conventional flow rates) is at least 5% less than a conventional average grain size of a central portion of a conventional metallic ribbon produced using the above-mentioned conventional method (and above-mentioned conventional flow rate). Preferably, an average grain size of a central portion of the final metallic ribbon 220 produced as a result of the above-mentioned increased flow rate of 10% of the molten mixture of alloys 200 (as compared to conventional flow rates) is at least 10% less than a conventional average grain size of a central portion of a conventional metallic ribbon produced using the above-mentioned conventional method (and above-mentioned conventional flow rate). Preferably, the flow rate of the molten mixture of alloys 200 provided to the outer contact surface 122 of the rotating wheel 120 (which is rotating at a first rotation speed or first wheel speed) may be increased by at least 30% as compared to the above-mentioned conventional flow rate of the molten mixture of alloys 200 used in the above-mentioned conventional methods. Preferably, an average grain size of a central portion of the final metallic ribbon 220 produced as a result of the above-mentioned increased flow rate of 30% of the molten mixture of alloys 200 (as compared to conventional flow rates) is at least 5% less than a conventional average grain size of a central portion of a conventional metallic ribbon produced using the above-mentioned conventional method (and above-mentioned conventional flow rate). Preferably, an average grain size of a central portion of the final metallic ribbon 220 produced as a result of the above-mentioned increased flow rate of 30% of the molten mixture of alloys 200 (as compared to conventional flow rates) is at least 10% less than a conventional average grain size of a central portion of a conventional metallic ribbon produced using the above-mentioned conventional method (and above-mentioned conventional flow rate).

Comparative Example

Figure 4A:
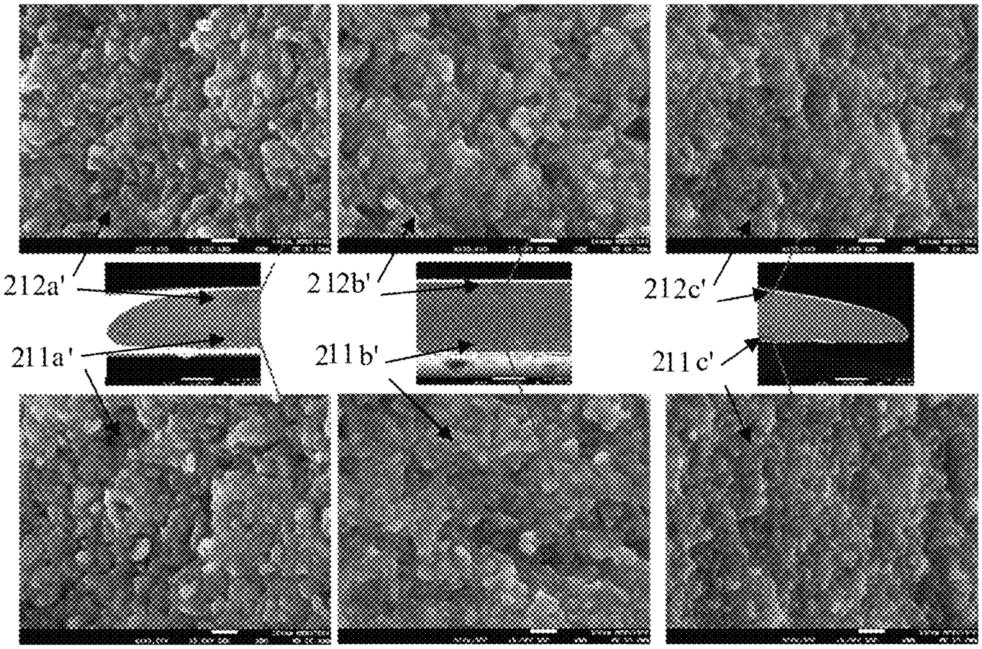
FIG. 4A illustrates FESEM images of a preliminary metallic ribbon.
Figures 5A, 5B:
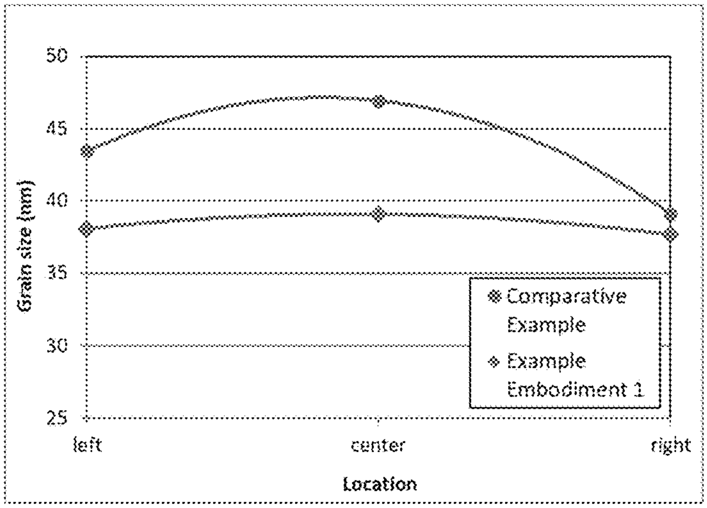
FIG. 5A illustrates a table of average grain sizes for the Comparative Example and the Example Embodiment 1.
FIG. 5B illustrates a graph of average grain sizes for the Comparative Example and the Example Embodiment 1.
Figures 5C, 5D, 5E:
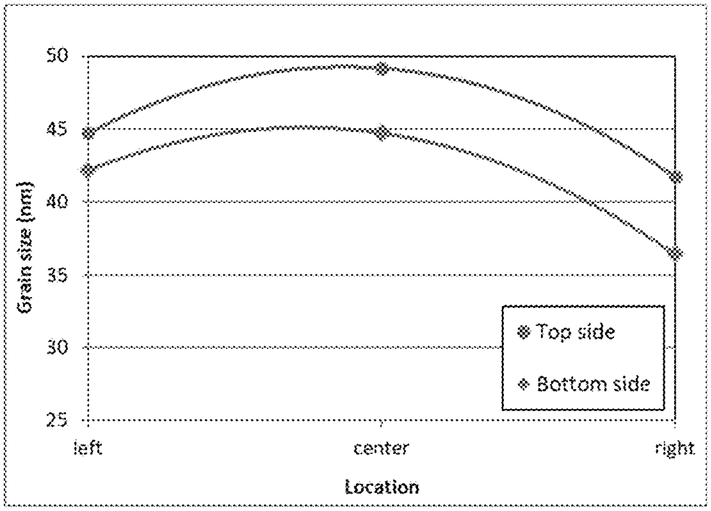
FIG. 5C illustrates a table of average grain sizes for the various areas/regions of the preliminary metallic ribbon.
FIG. 5D illustrates a graph of average grain sizes for the various areas/regions of the preliminary metallic ribbon.
FIG. 5E illustrates a table of average grain sizes for the various areas/regions of the final metallic ribbon.

A mixture of alloys (alloy composition 31.4% NdPr-0.5% Ga-0.915% B-balance Fe) was provided in the crucible assembly and melted to form a molten mixture of alloys. A melt-spinning process was performed to rapidly solidify the molten mixture of alloys (via the rotating wheel assembly), forming a preliminary metallic ribbon. In this Comparative Example, the grain size refinement and uniformity process was not performed on the preliminary metallic ribbon. FIG. 4A illustrates FESEM (Field Emission Scanning Electron Microscope) images of the preliminary metallic ribbon obtained in Comparative Example taken at a magnification of ×2,500 (for the 3 cross-sectional views in the second row) and ×100,000 (for the 6 representative areas in the first and third rows, which illustrate grains for the top left side 212*a*', top center side 212*b*', top right side 212*c*', bottom left side 211*a*', bottom center side 211*b*', and bottom right side 211*c*' of the preliminary metallic ribbon). FIG. 5A and FIG. 5B illustrate a table and graph, respectively, of average grain size measurements (an average calculation of the average grain size for the top side (see FIGS. 5C and 5D) and average grain size for the bottom side (see FIGS. 5C and 5D)) obtained for the preliminary metallic ribbon of Comparative Example; and FIG. 5C and FIG. 5D illustrate a table and graph, respectively, of average grain size measurements (average grain size for the top side and average grain size for the bottom side, which are separately provided and not averaged as in FIGS. 5A and 5B) obtained for the preliminary metallic ribbon of Comparative Example. The average grain sizes were obtained using image-J open source software. As illustrated in FIGS. 5A and 5B, the average grain size for the left side (average for 212*a*' and 211*a*') of the preliminary metallic ribbon was measured to be 43.5 nm; the average grain size for the center (average for 212*b*' and 211*b*') of the preliminary metallic ribbon was measured to be 46.9 nm; and the average grain size for the right side (average for 212*c*' and 211*c*') of the preliminary metallic ribbon was measured to be 39.1 nm. Furthermore, as illustrated in FIGS. 5C and 5D, the average grain size for the top left side 212*a*' of the preliminary metallic ribbon was measured to be 44.7 nm; the average grain size for the top center side 212*b*' of the preliminary metallic ribbon was measured to be 49.2 nm; and the average grain size for the top right side 212*c*' of the preliminary metallic ribbon was measured to be 41.7 nm. Furthermore, as illustrated in FIGS. 5C and 5D, the average grain size for the bottom left side 211*a*' of the preliminary metallic ribbon was measured to be 42.2 nm; the average grain size for the bottom center side 211*b*' of the preliminary metallic ribbon was measured to be 44.7 nm; and the average grain size for the bottom right side 211*c*' of the preliminary metallic ribbon was measured to be 36.4 nm.

Example Embodiment 1

Figure 4B:
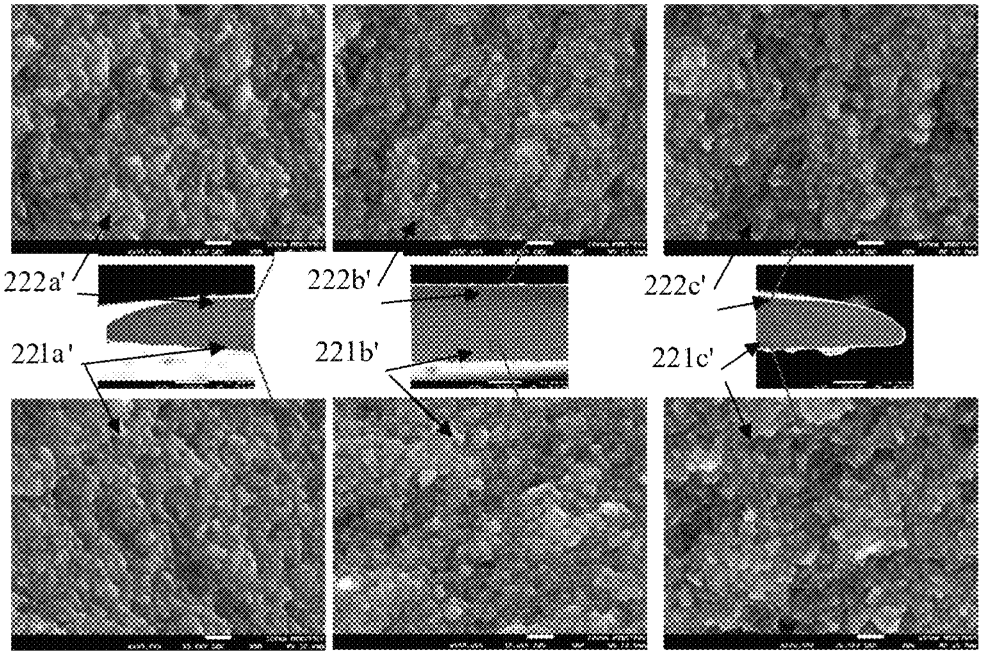
FIG. 4B illustrates FESEM images of a final metallic ribbon.
Figure 5F:
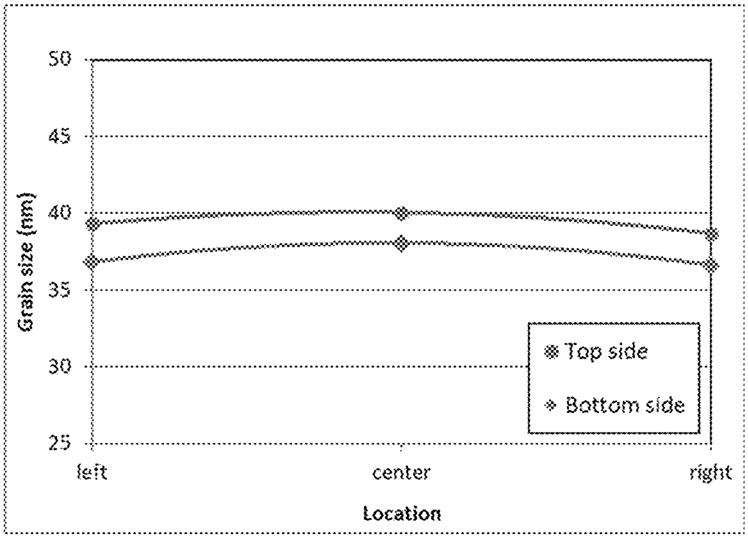
FIG. 5F illustrates a graph of average grain sizes for the various areas/regions of the final metallic ribbon.

The same mixture of alloys as in Comparative Example (alloy composition 31.4% NdPr-0.5% Ga-0.915% B-balance Fe) was provided in the same crucible assembly as Comparative Example and melted to form the same molten mixture of alloys as Comparative Example. The molten mixture of alloys was rapidly solidified via the same rotating wheel assembly as Comparative Example, forming a preliminary metallic ribbon. In this Example Embodiment 1, the grain size refinement and uniformity process was performed on the preliminary metallic ribbon (using an example embodiment of the grain size refinement and uniformity assembly), including the delivering of an example embodiment of the coolant to the top surface of the preliminary metallic ribbon. FIG. 4B illustrates FESEM images of the final metallic ribbon of Example Embodiment 1 taken at a magnification of ×2,500 (for the 3 cross-sectional views in the second row) and ×100,000 (for the 6 representative areas in the first and third rows, which illustrate grains for the top left side 222*a*', top center side 222*b*', top right side 222*c*', bottom left side 221*a*', bottom center side 221*b*', and bottom right side 221*c*' of the preliminary metallic ribbon). FIGS. 5A and 5B illustrate a table and graph, respectively, of average grain size measurements (an average calculation of the average grain size for the top side (see FIGS. 5E and 5F) and average grain size for the bottom side (see FIGS. 5E and 5F)) obtained for the final metallic ribbon of Example Embodiment 1; and FIG. 5E and FIG. 5F illustrate a table and a graph, respectively, of average grain size measurements (average grain size for the top side and average grain size for the bottom side, which are separately provided and not averaged as in FIGS. 5A and 5B) obtained for the final metallic ribbon of Example Embodiment 1. The average grain sizes were obtained using image-J software. It is recognized in the present disclosure that the average grain size for the left side (average for 222*a*' and 221*a*') of the final metallic ribbon was measured to be 38.1 nm, which is 12.5% or 5.4 nm less than the average grain size for the left side (average for 212*a*' and 211*a*') of the preliminary metallic ribbon in Comparative Example. Furthermore, the average grain size for the center (average for 222*b*' and 221*b*') of the final metallic ribbon was measured to be 39.1 nm, which is 16.6% or 7.8 nm less than the average grain size for the center (average for 212*b*' and 211*b*') of the preliminary metallic ribbon in Comparative Example. Furthermore, the average grain size for the right side (average for 222*c*' and 221*c*') of the final metallic ribbon was measured to be 37.7 nm, which is 3.4% or 1.4 nm less than the average grain size for the right (212*c*', 211*c*') of the preliminary metallic ribbon of Comparative Example. Furthermore, the average grain size of the top left side 222*a*' is 5.4 nm or 12.08% less than the average grain size of the top left side 212*a*'; the average grain size of the bottom left side 221*a*' is 5.4 nm or 12.80% less than the average grain size of the bottom left side 211*a*'; the average grain size of the top center side 222*b*' is 9.1 nm or 18.50% less than the average grain size of the top center side 212*b*'; the average grain size of the bottom center side 221*b*' is 6.6 nm or 14.77% less than the average grain size of the bottom center side 211*b*'; and the average grain size of the top right side 222*c*' is 3 nm or 7.19% less than the average grain size of the top right side 212*c*'.

Furthermore, the difference between the average grain size of the center (average of 222*b*' and 221*b*') of 39.1 nm and the average grain size of the left side (average of 222*a*' and 221*a*') of 38.1 nm is 1 nm (or about 2.62% of the average grain size of the left side and about 2.56% of the average grain size of the center), which is significantly less than the difference between the average grain size of the center (average of 212*b*' and 211*b*') of 46.9 nm and the average grain size of the left side (212*a*', 211*a*') of 43.5 nm (which is 3.4 nm, or about 7.82% of the average grain size of the left; and about 7.25% of the average grain size of the center, respectively). Furthermore, the difference between the average grain size of the top center (222*b*') of 40.1 nm and the average grain size of the top left side (222*a*') of 39.3 nm is 0.8 nm (or about 2.04% of the average grain size of the top left side and about 2.00% of the average grain size of the top center), which is significantly less than the difference between the average grain size of the top center (212*b*') of 49.2 nm and the average grain size of the top left side (212*a*') of 44.7 nm (which is 4.5 nm, or about 10.07% of the average grain size of the top left side; and about 9.15% of the average grain size of the top center, respectively). Furthermore, the difference between the average grain size of the bottom center (221*b*') of 38.1 nm and the average grain size of the bottom left side (221*a*') of 36.8 nm is 1.3 nm (or about 3.53% of the average grain size of the bottom left side and about 3.41% of the average grain size of the bottom center), which is significantly less than the difference between the average grain size of the bottom center (211b') of 44.7 nm and the average grain size of the bottom left side (211a') of 42.2 nm (which is 2.5 nm, or about 5.92% of the average grain size of the bottom left side; and about 5.59% of the average grain size of the bottom center, respectively).

Furthermore, the difference between the average grain size of the center (average of 222b' and 221b') of 39.1 nm and the average grain size of the right side (average of 222c' and 221c') of 37.7 nm is 1.4 nm (or about 3.71% of the average grain size of the right and about 3.58% of the average grain size of the center), which is significantly less than the difference between the average grain size of the center (average of 212b' and 211b') of 46.9 nm and the average grain size of the right side (average of 212c' and 211c') of 39.1 nm (which is 7.8 nm, or about 19.95% of the average grain size of the right side; and about 16.63% of the average grain size of the center, respectively). Furthermore, the difference between the average grain size of the top center (222b') of 40.1 nm and the average grain size of the top right side (222c') of 38.7 nm is 1.4 nm (or about 3.62% of the average grain size of the top right side and about 3.49% of the average grain size of the top center), which is significantly less than the difference between the average grain size of the top center (212b') of 49.2 nm and the average grain size of the top right side (212c') of 41.7 nm (which is 7.5 nm, or about 17.99% of the average grain size of the top right side; and about 15.24% of the average grain size of the top center, respectively). Furthermore, the difference between the average grain size of the bottom center (221b') of 38.1 nm and the average grain size of the bottom right side (221c') of 36.6 nm is 1.5 nm (or about 4.01% of the average grain size of the bottom right side and about 3.94% of the average grain size of the bottom center), which is significantly less than the difference between the average grain size of the bottom center (211b') of 44.7 nm and the average grain size of the bottom right side (211c') of 36.4 nm (which is 8.3 nm, or about 22.80% of the average grain size of the bottom right side; and about 18.57% of the average grain size of the bottom center, respectively).

It is recognized in the present disclosure that in performing example embodiments of the grain size refinement and uniformity process, including the delivering of example embodiments of the coolant to a preliminary metallic ribbon by example embodiments of the grain size refinement and uniformity assembly, one or more of the following advantages and/or improvements are achievable or achieved: a smaller and more uniform is achieved across a width of the final metallic ribbon (e.g., smaller difference between average grain sizes of the left side (average, top, bottom), center (average, top, bottom), and right side (average, top, bottom)) as compared to conventional methods and as compared to the preliminary metallic ribbon; and/or a smaller average grain size of the left side of the final metallic ribbon as compared to conventional methods and as compared to the left side of the preliminary metallic ribbon; and/or a smaller average grain size of the center of the final metallic ribbon as compared to conventional methods and as compared to the center of the preliminary metallic ribbon; and/or a smaller average grain size of the right side of the final metallic ribbon as compared to conventional methods and as compared to the right side of the preliminary metallic ribbon; and/or a smaller average grain size of the top left side of the final metallic ribbon as compared to conventional methods and as compared to the top left side of the preliminary metallic ribbon; and/or a smaller average grain size of the top center of the final metallic ribbon as compared to conventional methods and as compared to the top center of the preliminary metallic ribbon; and/or a smaller average grain size of the top right side of the final metallic ribbon as compared to conventional methods and as compared to the top right side of the preliminary metallic ribbon; and/or a smaller average grain size of the bottom left side of the final metallic ribbon as compared to conventional methods and as compared to the bottom left side of the preliminary metallic ribbon; and/or a smaller average grain size of the bottom center of the final metallic ribbon as compared to conventional methods and as compared to the bottom center of the preliminary metallic ribbon; and/or a smaller average grain size of the bottom right side of the final metallic ribbon as compared to conventional methods and as compared to the bottom right side of the preliminary metallic ribbon; and/or an increased flow rate (as compared to conventional methods) of the molten mixture of alloys provided to the rotatable wheel of the rotatable wheel assembly (when performing the melt-spinning process) without a need to increase the wheel speed (or rotational speed) of the rotatable wheel, which achieves one or more of the advantages and/or improvements described above and in the present disclosure; and/or a reduction in the wheel speed (or rotational speed) of the rotatable wheel (when performing the melt-spinning process) (as compared to conventional methods) without a need to increase the flow rate of the molten mixture of alloys provided to the rotatable wheel of the rotatable wheel assembly, which achieves one or more of the advantages and/or improvements described above and in the present disclosure; and/or an increase in thickness of the preliminary metallic ribbon and final metallic ribbon (as compared to conventional methods) without a need to reduce the flow rate of the molten mixture of alloys provided to the rotatable wheel of the rotatable wheel assembly, which achieves one or more of the advantages and/or improvements described above and in the present disclosure; and/or an increase in thickness of the preliminary metallic ribbon and final metallic ribbon (as compared to conventional methods) without a need to reduce the wheel speed (or rotational speed) of the rotatable wheel of the rotatable wheel assembly, which achieves one or more of the advantages and/or improvements described above and in the present disclosure; and/or prolonged rotating wheel run time achievable by lowering wheel speed (or rotational speed) of the rotatable wheel without compromising the average grain sizes and uniformity of the average grain sizes.

While various embodiments in accordance with the disclosed principles have been described above, it should be understood that they have been presented by way of example only, and are not limiting. Thus, the breadth and scope of the example embodiments described in the present disclosure should not be limited by any of the above-described exemplary embodiments, but should be defined only in accordance with the claims and their equivalents issuing from this disclosure. Furthermore, the above advantages and features are provided in described embodiments, but shall not limit the application of such issued claims to processes and structures accomplishing any or all of the above advantages.

Various terms used herein have special meanings within the present technical field. Whether a particular term should be construed as such a "term of art" depends on the context in which that term is used. Terms are to be construed in light of the context in which they are used in the present disclosure and as one of ordinary skill in the art would understand those terms in the disclosed context. Definitions provided herein are not exclusive of other meanings that might be imparted to those terms based on the disclosed context.

Words of comparison, measurement, and timing such as "at the time", "equivalent", "during", "complete", and the like should be understood to mean "substantially at the time", "substantially equivalent", "substantially during", "substantially complete", etc., where "substantially" means that such comparisons, measurements, and timings are practicable to accomplish the implicitly or expressly stated desired result.

Additionally, the section headings and topic headings herein are provided for consistency with the suggestions under various patent regulations and practice, or otherwise to provide organizational cues. These headings shall not limit or characterize the embodiments set out in any claims that may issue from this disclosure. Specifically, a description of a technology in the "Background" is not to be construed as an admission that technology is prior art to any embodiments in this disclosure. Furthermore, any reference in this disclosure to "invention" in the singular should not be used to argue that there is only a single point of novelty in this disclosure. Multiple inventions may be set forth according to the limitations of the claims issuing from this disclosure, and such claims accordingly define the invention(s), and their equivalents, that are protected thereby. In all instances, the scope of such claims shall be considered on their own merits in light of this disclosure, but should not be constrained by the headings herein.

What is claimed is:

1. A method of producing magnetic material, the method comprising:

providing a mixture of alloys;

melting the mixture of alloys to arrive at a molten mixture of alloys;

performing, in a chamber, a melt-spinning process to rapidly solidify the molten mixture of alloys via a rotatable wheel to arrive at a preliminary metallic ribbon, the preliminary metallic ribbon having an elongated flat body with a bottom side and a top side, the top side opposite to the bottom side;

performing, in the chamber, a grain size refinement and uniformity process to the preliminary metallic ribbon to form a final metallic ribbon, the grain size refinement and uniformity process including:

delivering a first coolant from a first nozzle of a coolant assembly directly to at least a central region of the top side of the preliminary metallic ribbon; and delivering the first coolant from a second nozzle of the coolant assembly directly to at least a central region of the bottom side of the preliminary metallic ribbon, wherein the first coolant is delivered from the second nozzle of the coolant assembly to at least the central region of the bottom side of the preliminary metallic ribbon that is no longer in contact with the rotatable wheel; and dynamically maintaining, within the chamber, a consistent environment, including dynamically maintaining at least one of internal pressure conditions and internal temperature conditions within the chamber based on the delivery of the first coolant.

2. The method of producing magnetic material of claim 1, wherein the first coolant delivered to at least the central region of the top side and/or bottom side of the preliminary metallic ribbon includes a stream of liquid argon, liquid helium, and/or one or more other noble gas in liquid state.

3. The method of producing magnetic material of claim 1, wherein:

an average grain size of a central portion of top and bottom sides of the final metallic ribbon are less than 45 nm.

4. The method of producing magnetic material of claim 3, wherein:

the average grain size of the central portion of the bottom side of the final metallic ribbon is less than 40 nm.

5. The method of producing magnetic material of claim 1, wherein:

a flow rate of the molten mixture of alloys provided to the rotatable wheel is between 0.2 kg/min to 5.0 kg/min;

the rapid solidifying includes rotating the rotatable wheel at a first wheel speed;

an average grain size of a central portion of the bottom side of the final metallic ribbon is less than 40 nm.

6. The method of producing magnetic material of claim 1, wherein one or more of the following apply:

a difference between an average grain size of a central portion of the final metallic ribbon and an average grain size of an edge portion of the final metallic ribbon is less than 10%; and/or a difference between an average grain size of a central portion of the final metallic ribbon and an average grain size of both edge portions of the final metallic ribbon is less than 10%; and/or a difference between an average grain size of a central portion of the final metallic ribbon and an average grain size of an edge portion of the final metallic ribbon is less than 5 nm; and/or a difference between an average grain size of a central portion of the final metallic ribbon and an average grain size of both edge portions of the final metallic ribbon is less than 5 nm; and/or an average grain size of a central portion and both edge portions of the final metallic ribbon is less than 50 nm; and/or an average grain size of a central portion of the final metallic ribbon is less than 50 nm.

7. The method of producing magnetic material of claim 1, wherein one or more of the following apply:

a difference between an average grain size of a central portion of the final metallic ribbon and an average grain size of an edge portion of the final metallic ribbon is less than 5%; and/or a difference between an average grain size of a central portion of the final metallic ribbon and an average grain size of both edge portions of the final metallic ribbon is less than 5%; and/or a difference between an average grain size of a central portion of the final metallic ribbon and an average grain size of an edge portion of the final metallic ribbon is less than 2 nm; and/or a difference between an average grain size of a central portion of the final metallic ribbon and an average grain size of both edge portions of the final metallic ribbon is less than 2 nm; and/or an average grain size of a central portion and both edge portions of the final metallic ribbon is less than 40 nm; and/or an average grain size of a central portion of the final metallic ribbon is less than 40 nm.

8. The method of producing magnetic material of claim 1, wherein the mixture of alloys includes RE-Fe—Co-M-B, where RE is one or more rare earth elements, and wherein M is one or more elements selected from the elements Ga, Cu, Al, Nb, Zr, W, Ti, Si, C, and Mo.

9. A method of producing magnetic material, the method comprising:

providing a mixture of alloys;

melting the mixture of alloys to arrive at a molten mixture of alloys;

performing, in a chamber, a melt-spinning process to rapidly solidify the molten mixture of alloys via a rotatable wheel to arrive at a preliminary metallic ribbon, the preliminary metallic ribbon having an elongated flat body with a bottom side and a top side, the top side opposite to the bottom side;

performing, in a chamber, a grain size refinement and uniformity process to the preliminary metallic ribbon to form a final metallic ribbon, the grain size refinement and uniformity process including:

delivering a first coolant from a first nozzle of a coolant assembly directly to at least a central region of the top side of the preliminary metallic ribbon; and delivering the first coolant from a second nozzle of the coolant assembly directly to at least a central region of the bottom side of the preliminary metallic ribbon, wherein the first coolant is delivered from the second nozzle of the coolant assembly to at least the central region of the bottom side of the preliminary metallic ribbon that is no longer in contact with the rotatable wheel; and dynamically maintaining, within the chamber, a consistent environment, including dynamically maintaining at least one of internal pressure conditions and internal temperature conditions within the chamber based on the delivery of the first coolant;

wherein a difference between an average grain size of the central region of the bottom side of the final metallic ribbon and an average grain size of an edge portion of the bottom side of the final metallic ribbon is less than 10%; and/or wherein a difference between an average grain size of the central region of the top side of the final metallic ribbon and an average grain size of an edge portion of the top side of the final metallic ribbon is less than 10%; and/or wherein a difference between an average grain size of the central region of the bottom side of the final metallic ribbon and an average grain size of an edge portion of the bottom side of the final metallic ribbon is less than 5 nm; and/or wherein a difference between an average grain size of the central region of the top side of the final metallic ribbon and an average grain size of an edge portion of the top side of the final metallic ribbon is less than 5 nm.

10. The method of claim 9, wherein one or more of the following apply:

wherein the difference between the average grain size of the central region of the bottom side of the final metallic ribbon and the average grain size of the edge portion of the bottom side of the final metallic ribbon is less than 5%; and/or wherein the difference between the average grain size of the central region of the top side of the final metallic ribbon and the average grain size of the edge portion of the top side of the final metallic ribbon is less than 5%; and/or wherein the difference between the average grain size of the central region of the bottom side of the final metallic ribbon and the average grain size of the edge portion of the bottom side of the final metallic ribbon is less than 2 nm; and/or wherein the difference between the average grain size of the central region of the top side of the final metallic ribbon and the average grain size of an edge portion of the top side of the final metallic ribbon is less than 2 nm.

11. The method of producing magnetic material of claim 9, wherein the first coolant delivered to the central region of the top side and bottom side of the preliminary metallic ribbon includes a stream of liquid argon, liquid helium, and/or one or more other noble gas in liquid state.

12. The method of producing magnetic material of claim 9, wherein:

a flow rate of the molten mixture of alloys provided to the rotatable wheel is between 0.2 kg/min to 5.0 kg/min;

the rapid solidifying includes rotating the rotatable wheel at a first wheel speed;

an average grain size of a central portion of the bottom side of the final metallic ribbon is less than 40 nm.

13. The method of producing magnetic material of claim 9, wherein the mixture of alloys includes RE-Fe—Co-M-B, wherein RE is one or more rare earth elements, and wherein M is one or more elements selected from the elements Ga, Cu, Al, Nb, Zr, W, Ti, Si, C, and Mo.

14. A method of producing magnetic material, the method comprising:

providing a mixture of alloys;

melting the mixture of alloys to arrive at a molten mixture of alloys;

performing, in a chamber, a melt-spinning process to rapidly solidify the molten mixture of alloys via a rotatable wheel to arrive at a preliminary metallic ribbon, the preliminary metallic ribbon having an elongated flat body with a bottom side and a top side, the top side opposite to the bottom side;

performing, in the chamber, a grain size refinement and uniformity process to form a final metallic ribbon, the grain size refinement and uniformity process including:

delivering a first coolant from a first nozzle of a coolant assembly directly to at least a central region of the top side of the preliminary metallic ribbon; and delivering the first coolant from a second nozzle of the coolant assembly directly to at least a central region of the bottom side of the preliminary metallic ribbon, wherein the first coolant is delivered from the second nozzle of the coolant assembly to at least the central region of the bottom side of the preliminary metallic ribbon that is no longer in contact with the rotatable wheel; and dynamically maintaining, within the chamber, a consistent environment, including dynamically maintaining at least one of internal pressure conditions and internal temperature conditions within the chamber based on the delivery of the first coolant;

wherein a difference between an average grain size of the central region of the bottom side of the final metallic ribbon and an average grain size of an edge portion of the bottom side of the final metallic ribbon is less than 5 nm; and wherein a difference between an average grain size of the central region of the top side of the final metallic ribbon and an average grain size of an edge portion of the top side of the final metallic ribbon is less than 5 nm.

15. The method of producing magnetic material of claim 14, wherein the first coolant delivered to at least the central region of the top side and bottom side of the preliminary metallic ribbon includes a stream of liquid argon, liquid helium, and/or one or more other noble gas in liquid state.

16. The method of producing magnetic material of claim 14, wherein:

a flow rate of the molten mixture of alloys provided to the rotatable wheel is between 0.2 kg/min to 5.0 kg/min;

the rapid solidifying includes rotating the rotatable wheel at a first wheel speed.

17. The method of producing magnetic material of claim 14, wherein one or more of the following apply:

a difference between an average grain size of a central portion of the final metallic ribbon and an average grain size of an edge portion of the final metallic ribbon is less than 10%; and/or a difference between an average grain size of a central portion of the final metallic ribbon and an average grain size of both edge portions of the final metallic ribbon is less than 10%.

18. The method of claim 17, wherein one or more of the following apply:

the difference between the average grain size of the central portion of the final metallic ribbon and the average grain size of the edge portion of the final metallic ribbon is less than 5%; and/or a difference between an average grain size of a central portion of the final metallic ribbon and an average grain size of both edge portions of the final metallic ribbon is less than 5%.

19. The method of producing magnetic material of claim 14, wherein the mixture of alloys includes RE-Fe—Co-M-B, wherein RE is one or more rare earth elements, and wherein M is one or more elements selected from the elements Ga, Cu, Al, Nb, Zr, W, Ti, Si, C, and Mo.

* * * * *